US006769020B2

(12) United States Patent
Miyazaki et al.

(10) Patent No.: US 6,769,020 B2
(45) Date of Patent: Jul. 27, 2004

(54) DATA TERMINAL, DATA DISTRIBUTION SYSTEM, AND INTERNET TELEPHONE SYSTEM

(75) Inventors: Tomiya Miyazaki, Fukuoka (JP); Kazuo Yahiro, Fukuoka (JP); Toru Imamura, Fukuoka (JP); Masafumi Tanaka, Fukuoka (JP); Yutaka Takeda, Fukuoka (JP); Keisuke Ogata, Fukuoka (JP); Takuji Tsujigawa, Fukuoka (JP); Akitoshi Aritaka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 549 days.

(21) Appl. No.: 09/742,872

(22) Filed: Dec. 21, 2000

(65) Prior Publication Data

US 2001/0023428 A1 Sep. 20, 2001

(30) Foreign Application Priority Data

Dec. 24, 1999 (JP) ............................................. 11-367206
Dec. 24, 1999 (JP) ............................................. 11-367207
Dec. 24, 1999 (JP) ............................................. 11-367208

(51) Int. Cl.$^7$ ............................................. G06F 13/00
(52) U.S. Cl. ...................... 709/219; 709/225; 709/250; 379/114.01; 379/900
(58) Field of Search ............................... 709/217, 219, 709/223, 225, 227, 228, 229, 238, 250; 719/328, 329; 379/114.01, 900, 902, 903

(56) References Cited

U.S. PATENT DOCUMENTS

| | | | | |
|---|---|---|---|---|
| 5,761,280 A | * | 6/1998 | Noonen et al. | 379/93.27 |
| 5,826,026 A | * | 10/1998 | Friedman | 709/217 |
| 6,108,329 A | * | 8/2000 | Oyama et al. | 370/352 |
| 6,285,364 B1 | * | 9/2001 | Giordano, III et al. | 345/347 |
| 6,404,885 B1 | * | 6/2002 | Field et al. | 379/266.04 |
| 6,606,611 B1 | * | 8/2003 | Khan | 706/10 |
| 6,614,551 B1 | * | 9/2003 | Peek | 358/1.15 |

* cited by examiner

Primary Examiner—Viet D. Vu
(74) Attorney, Agent, or Firm—RatnerPrestia

(57) ABSTRACT

A data terminal, a data distributing system, and an Internet telephoning system are provided where desired data such as advertisements can selectively be determined and used for enjoying its relevant services. The data terminal receives a summary of service data from a data provider apparatus over the Internet, and if desired, demands the data provider apparatus to provide the service data over the Internet. The service data from the data provider apparatus may selectively be received in at least one of an audio form, a text form, and a video form at the data terminal. The service data may be advertisement data, commercial product data, and entertainment data such as music, movies, and games. The entertainment data may selectively be presented as at least one of the title, the artist name, the cost, and a trial sample piece of the content.

32 Claims, 32 Drawing Sheets

FIG. 6
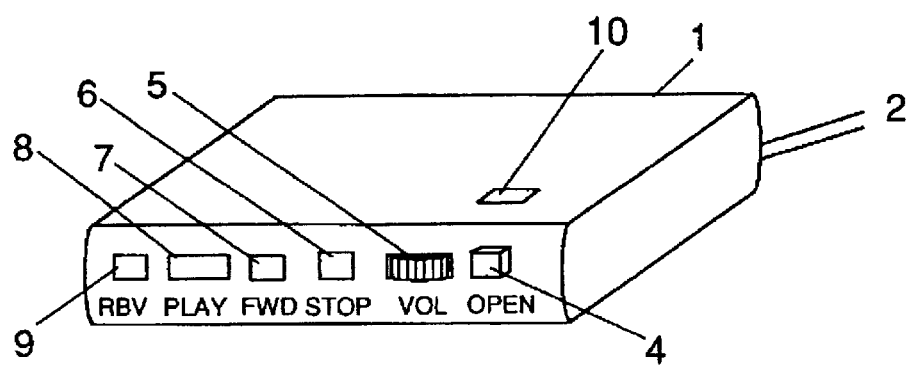
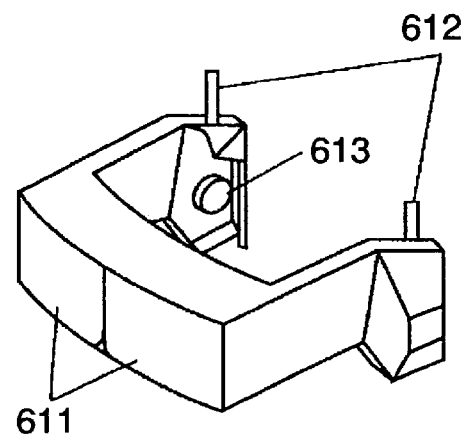

DATA TERMINAL, DATA DISTRIBUTION SYSTEM, AND INTERNET TELEPHONE SYSTEM

FIELD OF THE INVENTION

The present invention relates to a data terminal and a data distribution system for receiving and transmitting data over a communication network. The present invention also relates to an Internet telephone registration system for communicating with remote terminals at lower charge over the Internet.

BACKGROUND OF THE INVENTION

In a traditional public telephone network for connecting between telephones, voice signals are exchanged. Other audio data than the voice signals are now distributed over the traditional public telephone network, such as the Dial Q2 Service of Nippon Telephone Telegram, where a variety of commercial data audio signals are released from multiple providers via the switches of the network to the users. The service includes the network service carriers, instead of its providers, charging the fee of the commercial data and receiving it to the user who receives the commercial data. For transmitting the commercial data, the network service carrier has a data audio signal providing apparatus for delivering the audio data signal over the network to the user who selectively calls desired one of the Dial Q2 Service telephone numbers.

Recently, the commercial audio data can be received from the Internet where data is exchanged between computers. More specifically, thanks to the advanced CODEC technology and the perpetual development of the Internet as well as opening to every participant for the global communication over network-Internet-network systems and international network-dedicated network-network systems, a number of international telephone systems over the Internet are available these days.

However, such schemes for exchanging a variety of service data over the conventional communication network such as a public telephone network have been hardly provided. In a television broadcast system, an advertisement for requesting to visit a home page(HP) can be transferred only in one way to many unspecified users and cannot be involved to point-to-point communications.

In other words, the conventional advertisement distribution system delivers advertising items to many unspecified individuals and may thus force the user to receive the data.

FIG. 31 illustrates an Internet telephone system which has already been in service over the Internet. In the system, an ordinary telephone at the caller side is connected to an Internet telephone linked over the Internet to another Internet telephone gateway. And The telephone is further relayed from the another Internet telephone gateway to an ordinary telephone at the receiver side. That significantly contributes to reduce the charge of a long-distance call.

The procedure of calling on the system shown in FIG. 31 starts with connecting a call from the telephone 3112 at the caller side via a local telephone network 3113 to the caller side Internet telephone gateway 3114 to address the user identification number, the password number, and the receiver telephone number. Upon receiving the call from the telephone at the caller side, the caller side gateway 3114 selects one of Internet telephone gateways, as the receiver side gateway 3116, which exhibits the lowest charge for connecting the telephone 3118 at the receiver side. As a result, the connection to the receiver side telephone 3118 can be established over a receiver side local telephone network 3117.

However, the Internet telephone system shown in FIG. 32 requests the user at the caller side to call the Internet telephone gateway and address the user identification number, the password number, and the receiver side telephone number. Accordingly, the system requests a lot of steps for starting the Internet telephone call.

Also, in such a gateway-type Internet telephone system, the connection between the telephone of the caller or user and the Internet gateway is always turned on and charging to the caller even if the receiver side telephone is busy. In case that the receiver side telephone is busy throughout relatively a long period of time, the charge for the communication will be less expensive over the conventional public telephone network than the Internet telephone service.

SUMMARY OF THE INVENTION

An object of the present invention is to provide a data terminal and a data distributing system where particular data is selectively determined and used for receiving the desired service, and more specifically, the particular data is received from the outside.

The data terminal is arranged for, under the condition that it is connected to at least one data provider apparatus and at least one communication network, receiving and reproducing or storing a service data from the data provider apparatus over the communication network. The data terminal transmits a response to the service data to the data provider apparatus to selectively address desired information, and receiver can thus enjoy the service attributed to the information. Also, the data terminal may includes an input device for receiving the information and an interface for delivering the information. The data distributing system according to the present invention incorporates the data terminals.

More specifically, the user identification number, the password number, and the telephone number of an optimum available gateway are transmitted in a Dial Tone Multi-Frequency (DTMF) signal or a modem signal from a registration center and then automatically stored in the telephone. When the telephone starts a call over the Internet, it systematically dispatches those service data.

If the assigned gateway is busy, the telephone may automatically be connected to either an alternative gateway or the conventional public telephone network. Consequently, any undesired charge for connecting to the busy gateway will be eliminated.

BRIEF DESCRIPTION OF THE DRAWINGS

FIG. 6 is a perspective view of a data terminal according to Embodiment 2 of the present invention;

DETAILED DESCRIPTION OF THE PREFERRED EMBODIMENTS (Embodiment 1)

Figure 1:
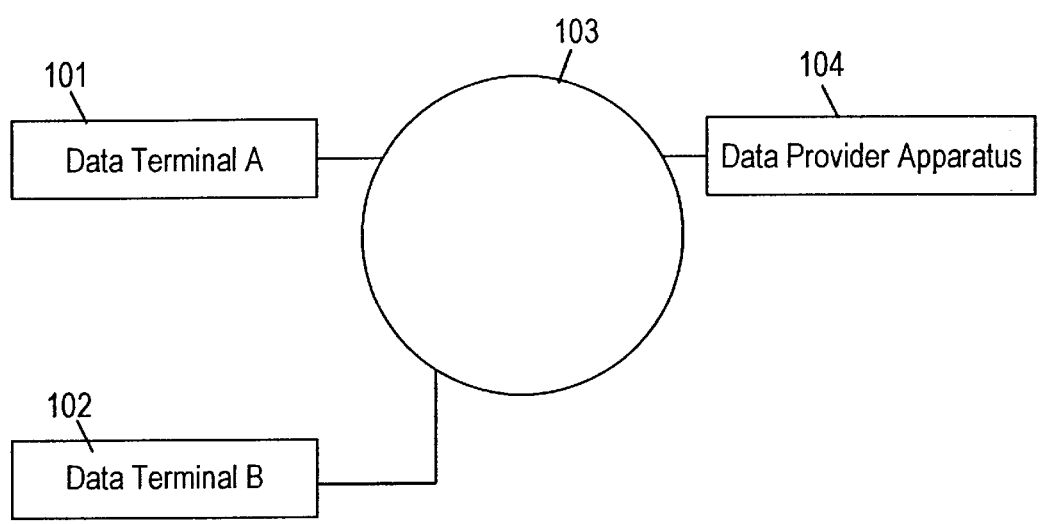
FIG. 1 is a schematic diagram of data terminals and a data distributing system according to Embodiment 1 of the present invention.

The present invention will be described in more detail in the form of a data communication system connected over the Internet as an Internet-protocol-aided communication network. FIG. 1 is a diagram of a data distribution system with data terminals according to Embodiment 1 of the present invention. As shown in FIG. 1, data terminal A 101 plays back and saves a service data received over Internet 103. The service data is transmitted from data provider apparatus 104 over Internet 103.

Data terminal A 101 may be a telephone, a facsimile, a TV telephone, a personal computer, or the like. The communication network may be the Integrated Service Digital Network (ISDN), the international public telephone network, a cable modem network, the Digital Subscriber Line (DSL) modem network, or any intranet connected in a single company or organization. Data terminal A 101 is connected via the communication network to the Internet. Internet 103 may be an open wide area network or an intranet connected in a single company or organization which provides the Internet Protocol (IP) layers over the Open Systems Interconnection (OSI). The communication level is not limited to the physical layer, can be the data link layer or the network layer.

Data terminal A 101 receives a service data from data provider apparatus 104 via Internet 103. Terminal A 101, if desired, demands data provider apparatus 104 for transmitting a service data over Internet 103. Upon receiving a demand from terminal A 101, data provider apparatus 104 selects and transmits at least one of audio signal, data signal, and video signal as the service data. The service data may be advertisement data, products data such as commodities, or entertainment data including music, movies, and games. The entertainment data may be at least one of a title, an artist name, price, and a trial piece of content.

The service data of data provider apparatus 104 is received by data terminal A 101. Terminal A 101, if desired, notifies data provider apparatus 104 with a demand for transmitting a service data. Upon receiving the demand, data provider apparatus 104 examines whether the demanded service data is available, and if so, transmits the service data to terminal A 101. When the demanded service data, for example, the delivery of a household product, cannot be transmitted over Internet 103, the demand is transferred to a delivery system which in turn delivers the product.

Figure 2:
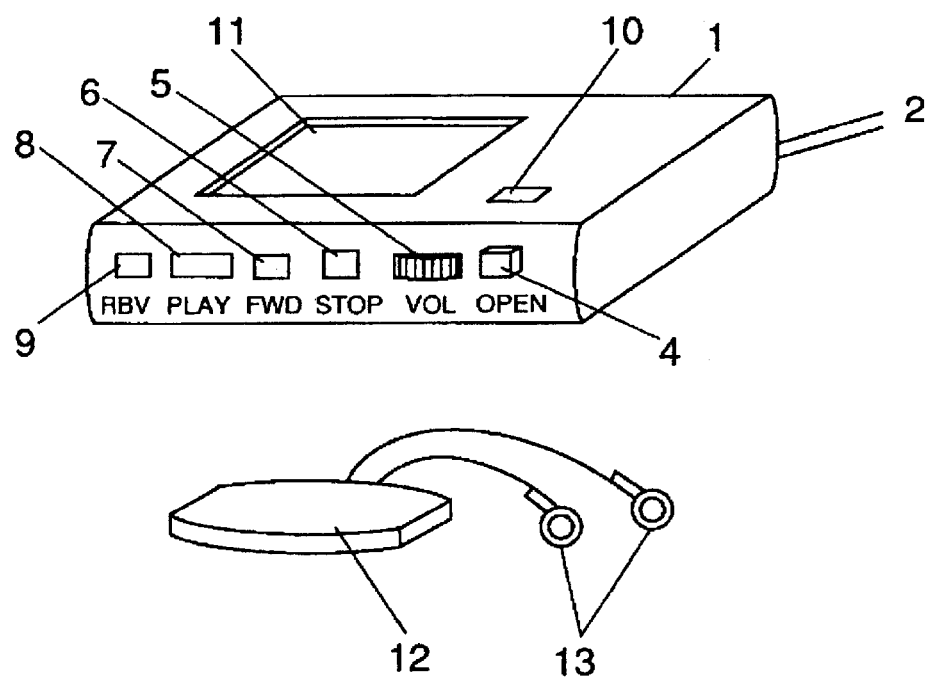
FIG. 2 is a perspective view of the data terminal according to Embodiment 1.

FIG. 2 is a perspective view of the data terminal according to Embodiment 1 of the present invention. In FIG. 2, data terminal 1 receives a service data in a digital form from the Internet via a communication line 2. The service data may be a part or all of video data such as texts and images and audio data or their compressed form. Terminal 1 comprises sound volume switch 5, stop switch 6, fast forward switch 7, playback/display switch 8, reverse switch 9, data selecting switch 10, and display 11 for displaying video data such as texts and images, specifically a liquid crystal display (LCD) in this embodiment. FM receiver 12 is provided with headphone 13 for listening to playback audio data. Terminal 1 employs a detachable card-type recording medium including a semiconductor memory although it is not shown. The recording medium is adapted for storing the service data received from communication line 2. Eject switch 4 is also provided for unloading the memory card from terminal 1. The memory card is loaded through a card loading opening and driven for playing back the stored data of which list is displayed as index data on display 11. This allows the user to select a desired data in the list on display 11 using data selecting switch 10.

When the selected data is an audio signal, an FM wave of it is transmitted from data terminal 1, received by FM receiver 12, and transferred as sounds via headphone 13 to the user. When the selected data consists of texts and images, it is displayed on display 11 for a specific duration as updated in a sequence predetermined by its display control command. When texts, images, and sounds are contained in the selected data, they are displayed and played-back with synchronized one the other. If the indexing is not necessary, the data can directly be displayed or played back in a specific sequence recorded in the memory card. Also, fast forward switch 7 and reverse switch 9 permit the user to search its desired data in both the forward and reverse directions.

Figure 3:
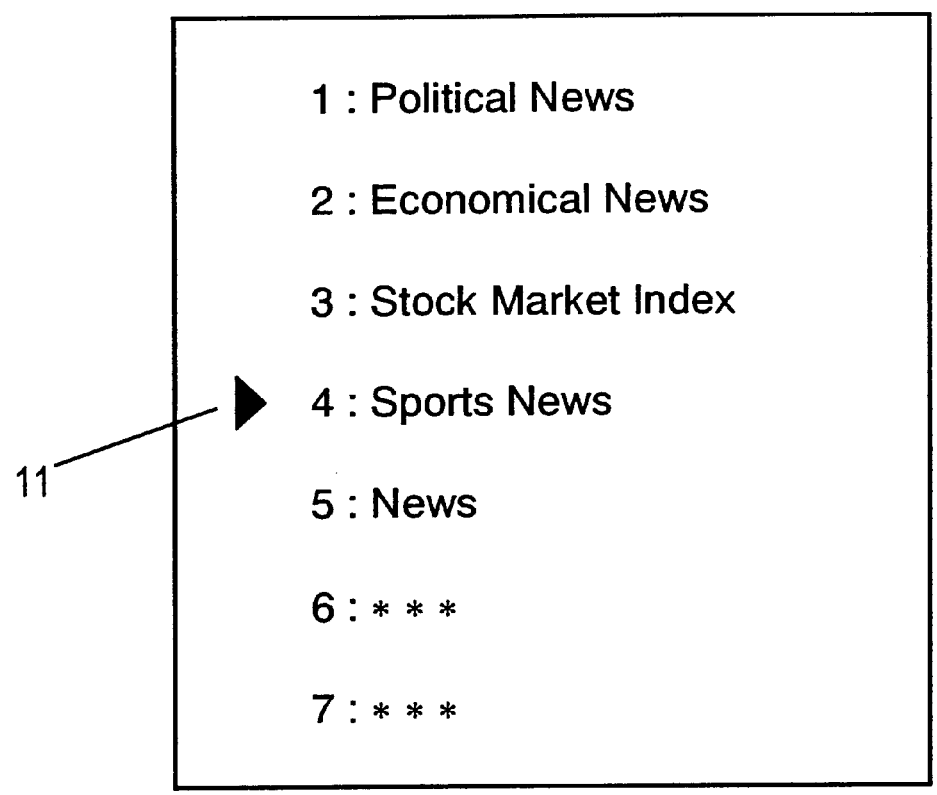
FIG. 3 is a displayed image on the data terminal according to Embodiment 1.
Figure 4:
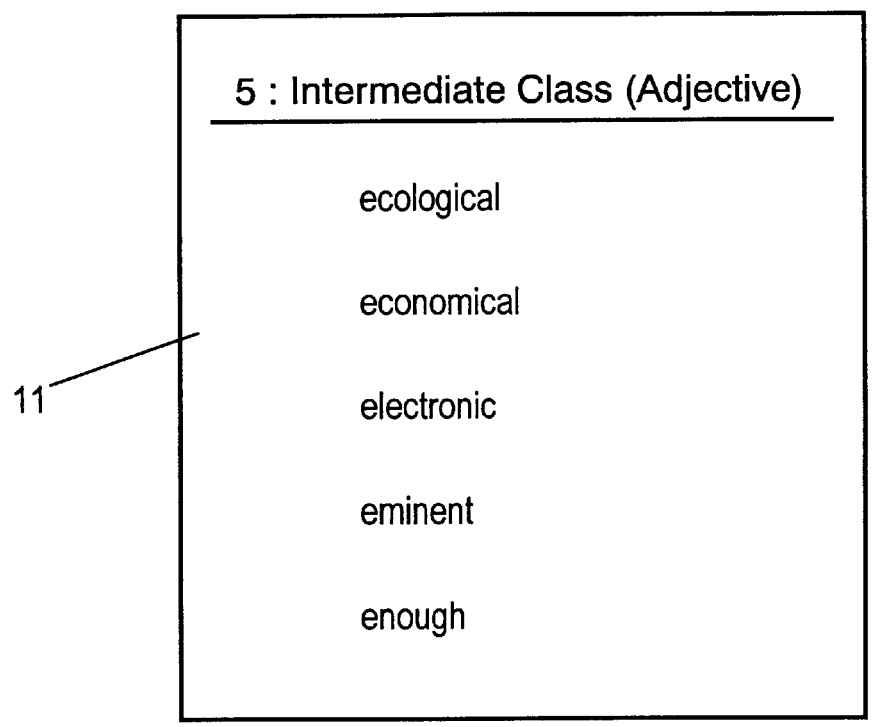
FIG. 4 is another displayed image on the data terminal according to Embodiment 1.

FIGS. 3 and 4 illustrate examples of images on display 11. An example shown in FIG. 3 is displayed on the data terminal according to Embodiment 1 of the present invention. "News" data requiring prompt display is stored in the memory card. A list of summaries of the "News" data is first displayed on display 11 for enabling the user to select a desired item using data selecting switch 10. For example, when "sports" is selected, its contents are displayed in texts and images on display 11. If the new data is accompanied with audio data, its sound is output from headphone 13 in synchronization with the texts and images and can thus be perceived by the user while watching the texts and images.

The example shown in FIG. 4 is also displayed on the data terminal according to Embodiment 1 of the present invention. As shown, the screen displays a list of English words for helping their pronunciation. When the user selects a group of words classified by difficulty, the words and their relevant illustration for correct pronunciation are displayed in a sequence on display 11, and their verbal sounds are output from headphone 13 in synchronization with the illustration. This allows the user to identify an English word and its verbal data while listening to its correct pronunciation.

When the selected data consists of two or more of text, image, and sound data, it is stored in the memory card one attribute after another together with a timing control signal for synchronizing the display of texts and images with their sounds. As the timing control signal for the playback action is initiated, the video data of texts and images and the audio data are played back in synchronization.

Figure 5:
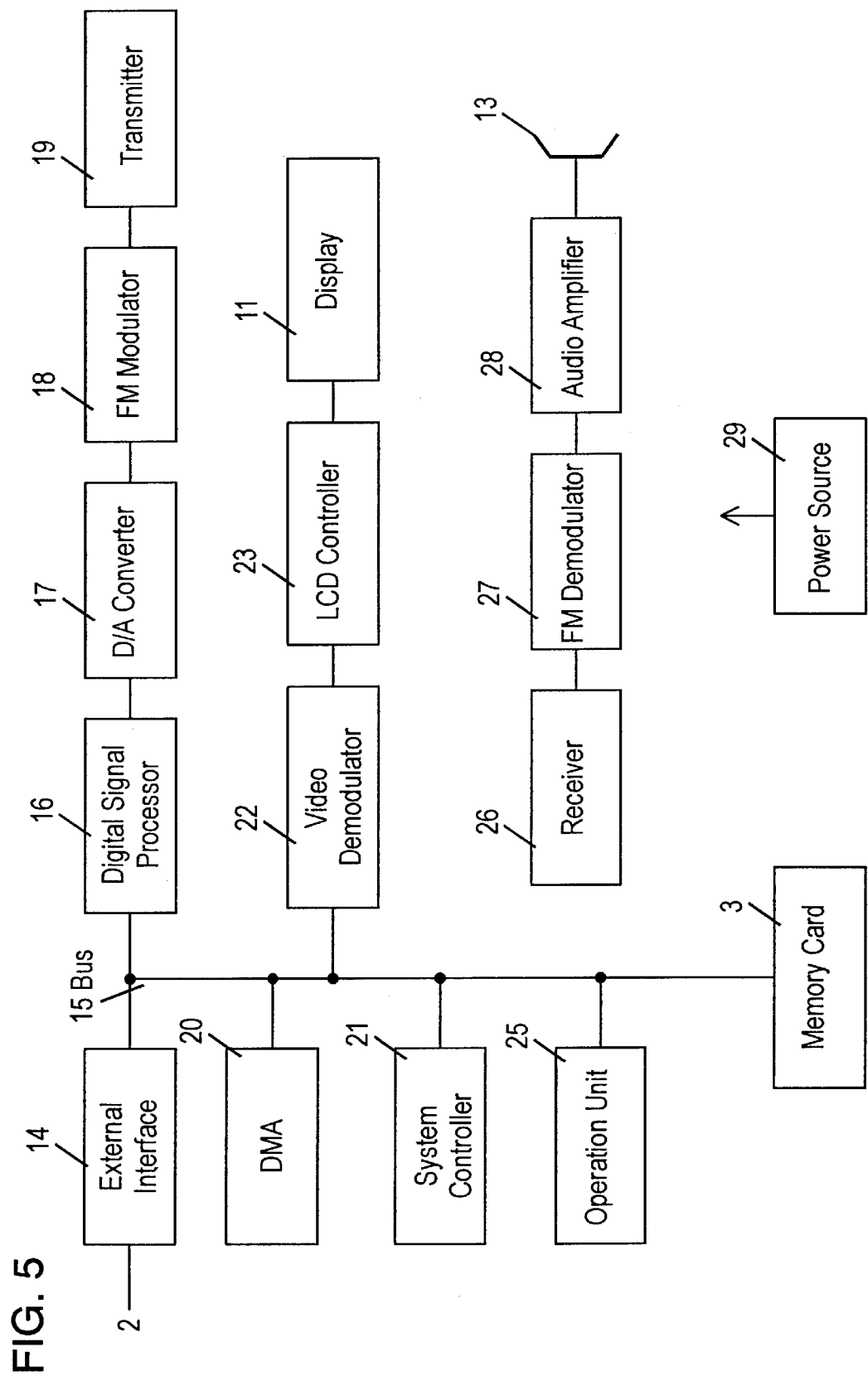
FIG. 5 is a block diagram of the data terminal according to Embodiment 1.

FIG. 5 is a block diagram of the data terminal according to Embodiment 1 of the present invention. As shown in FIG. 5, memory card 3 stores the video data such as texts and images and the audio data in a digital compressed form. External interface 14 receives a service data from communication line 2. The service data is then stored in memory card 3 connected to external interface 14. The service data stored in memory card 3 is read out via bus 15 by direct memory access controller (DMA) 20. A combination of external interface 14 and DMA 20 forms a data readout means for reading out data from memory card 3 as a recording medium.

The audio data read out from memory card 3 by the readout means is converted to a digital pre-compressed form, i.e., a retrieved data by digital signal processor 16, converted to an analog form by D/A converter 17, modified to an FM signal by FM modulator 18, and finally transmitted from transmitter 19. The FM signal is received by receiver 26, reconstructed to an analog audio signal by FM demodulator 27, and released as sounds from headphone 28 through audio amplifier 28. Headphone 28 forms sound-reproduction means. Power source 29 in data terminal 1 is a battery.

Similarly, the video data such as texts and images in a compressed form is read out from memory card 3, reconstructed by video demodulator 22, and displayed in the form of texts and images on display 11 by LCD controller 23. The playback means is constructed by digital signal processor 16, D/A converter 17, FM modulator 18, transmitter 19, receiver 26, FM demodulator 27, audio amplifier 28, video demodulator 22, and LCD controller 23.

System controller 21 performs a timer function and interruption action and controls reading data from memory card 3, a keyboard and a display, and each circuit in response to a relevant command. By the timer function, the user is notified that a setting time comes. That can be notified by stopping the playback, an alarm sound from headphone 13, actuating a vibrator (not shown) such as a piezoelectric device, or displaying on display 11. This allows the user to remain punctual at the setting time while no one knows.

The retrieving means for memory card 3 is also implemented by system controller 21. Operation unit 25 comprises eject switch 4, sound volume switch 5, stop switch 6, fast forward switch 7, playback and display switch 8, reverse switch 9, and data selecting switch 10. For inputting a retrieving data to system controller 21, data selecting switch 10 on operation unit 25 is selectively operated by the user. For the inputting, the action can start by operating another switch or by selecting from a set of keys displayed on display 11.

When the recording medium of Embodiment 1 is memory card 3 which has non-moving mechanisms, it may be improved in the size, the weight, and the resistance to impact. This minimizes the power consumption of the data terminal. Accordingly, with the data terminal of a battery-driven type, the user enjoys the service longer in the service period than any conventional data terminal and less troublesome for recharging.

The recording medium of Embodiment 1 may be a detachable type hard disk drive provides the same effects although it has a little less advantages in the resistance to impact or the power consumption than memory card 3.

Headphone 13 in Embodiment 1 is a cordless type and may be linked by a cable to the data terminal.

Data terminal 1 of Embodiment 1 is not limited to storing the service data in the recording medium such as a semiconductor memory but may directly play back the service data. For further minimizing the overall size and the price of the data terminal, the memory may be installed in another data terminal. The data terminal may be a personal computer or a like device. The detachable memory may be replaced by a built-in memory.

(Embodiment 2)

FIG. 6 is a perspective view of a data terminal according to Embodiment 2 of the present invention. Like components are denoted by like numerals as those of Embodiment 1 shown in FIG. 1 and will be explained in no more detail. In Embodiment 2, display 611 for displaying text and image data is formed integral with headphone 613 for releasing sound data. This allows the users to wear a combination of display 611 and headphone 613 on their head. The terminal is simply installed, and its operability will be improved.

The operation is similar to that of Embodiment 1 shown in FIG. 5, and only its difference will thus be explained. Display 611 of this embodiment may be of either binocular type or monocular type allowing the users can see outside with another eye. The binocular type may project two different images on the two, left and right, eyes respectively to develop a stereoscopic picture for improving the effect of depth.

Display 611 of Embodiment 2 may be a liquid crystal display or any other visual displaying means. The data terminal may also be a monitor or CRT of a television receiver or a personal computer.

(Embodiment 3)

Figure 7:
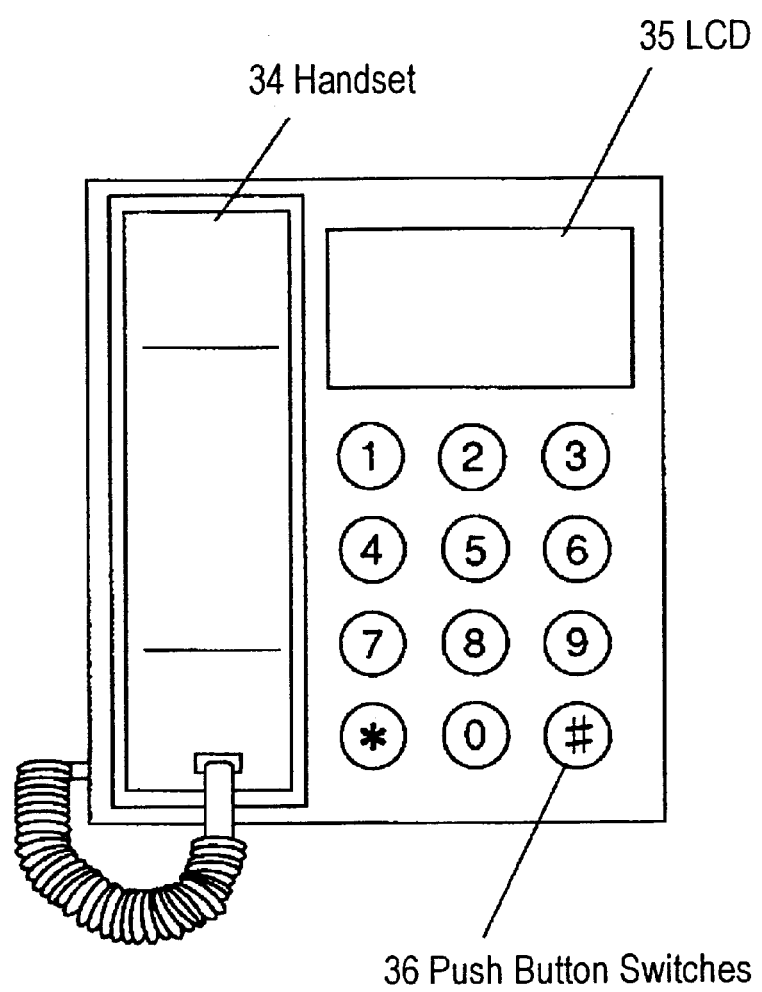
FIG. 7 is a front view of a data terminal according to Embodiment 3 of the present invention.

FIG. 7 is a front view of a data terminal in the form of a telephone according to Embodiment 3 of the present invention. As shown in FIG. 7, handset 34 also serves as a public telephone set. LCD 35 displays a menu to allow the user to select and store a data in a memory card. An array of push-button switches 36 functions as the numbering switches for making a call and the selecting switches for selecting one item of the menu to store its corresponding data in the memory card. The data terminal performs the same action as that of Embodiment 1 for demanding and receiving any desired service data. The data may be received in the from of dial tone multi frequency (DTMF) signal along with the common voice signal from the communication line. The memory card is not limited to a detachable type but may be implemented by a built-in memory.

(Embodiment 4)

Figure 8:
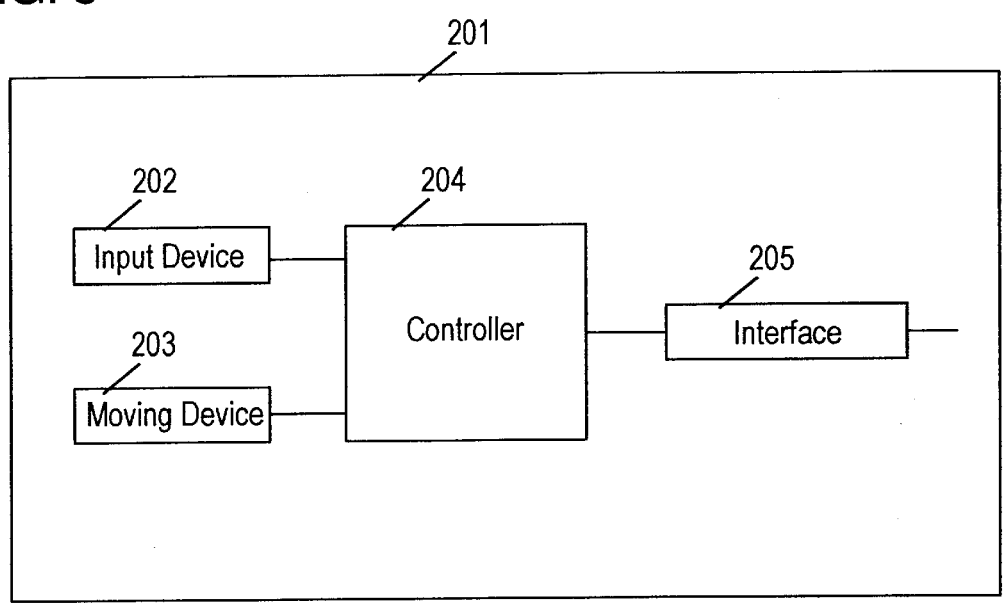
FIG. 8 is a block diagram of a data terminal according to Embodiment 4 of the present invention.

FIG. 8 is a block diagram of a data terminal according to Embodiment 4 of the present invention. Input device 202 such as a camera, a scanner, or a microphone inputs data to data terminal 201. Moving device 203 is a focusing means for panning in all, upward, downward, leftward, and rightward, directions and zooming. Controller 204 converts and transfers input data received from input device 202 to interface 205 and controls the movements of moving device 203 in response to a signal received from an external line. Interface 205 transmits the data to the external line and receives a command from the outside.

The action of data terminal 201 will now be explained. As data terminal 201 is accessed via the Internet from another data terminal, it prepares video and audio data through input device 202 and receives corresponding data via controller 204 and interface 205 from other data terminals. If more detailed data is requested, its relevant command for pertinent upward, downward, leftward, and rightward panning actions or zooming actions is received from the Internet by interface 205. Controller 204 examines the command and drives moving device 203 to perform the action according to the command. Accordingly, moving device 203 is actuated to collect desired video and audio data transmitted to the Internet. Moving device 203 of data terminal 201 may be omitted depending on the requirement. While the data terminal of Embodiment 4 is linked to the outside for receiving data, it may be adapted for monitoring local circumstances such as the inside and outside of a home.

(Embodiment 5)

Figure 9:
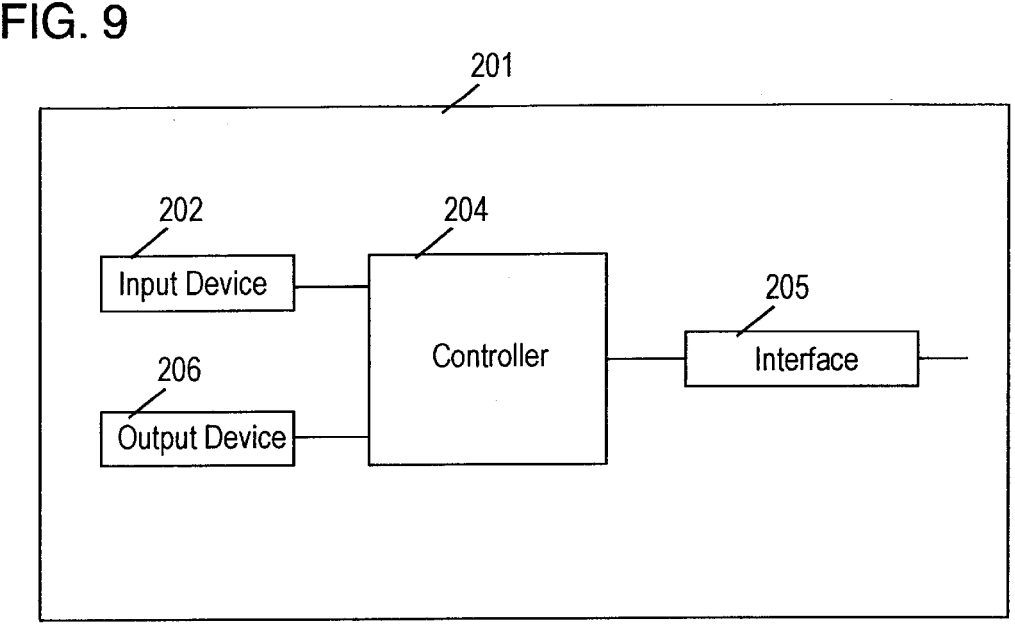
FIG. 9 is a block diagram of a data terminal according to Embodiment 5 of the present invention.

FIG. 9 is a block diagram of a data terminal according to Embodiment 5 of the present invention. Input device 202 such as a camera, a scanner, or a microphone inputs data to data terminal 201. Output device 206 includes a printer, a facsimile, a display, loudspeakers, and so on. Controller 204 converts and transfers input data received from input device 202 to interface 205 and transfers data received from an external line to output device 206. Interface 205 transmits the data to the external line and receives a command from the outside.

The action of data terminal 201 will now be explained. As data terminal 201 is accessed via the Internet from another data terminal, it prepares video and audio data through input device 202 and receives corresponding data via controller 204 and interface 205 from other data terminals and transfers it to output device 206. Controller 204 may deliver the data when the input data received from input device 201 is varied, a predetermined period of time has passed, or a demand for the data is received from the Internet. At least one of input device 202 and output device 206 may be omitted depending on the requirement. Moving device 203 described in Embodiment 4 shown in FIG. 9 may also be connected. While the data terminal of Embodiment 5 is linked to the outside for receiving data, it may be adapted for monitoring local circumstances such as the inside and outside of a home.

The data terminals according to Embodiments 1 through 5 may be provided with a security function for exchanging private data. For example, when finding that a key received via the Internet from a second data terminal matches its authorized master key, the data terminal transmits demanded data via the Internet to the second data terminal.

Accordingly, as the connection charge to a service line and an advertisement fee are favorably monitored, they can be shared by the user and the data provider.

When the data terminal according to any of Embodiments 1 through 5 is used for monitoring the inside and output of a home, it can release an alarm upon detecting an abnormal event.

(Embodiment 6)

Figure 10:
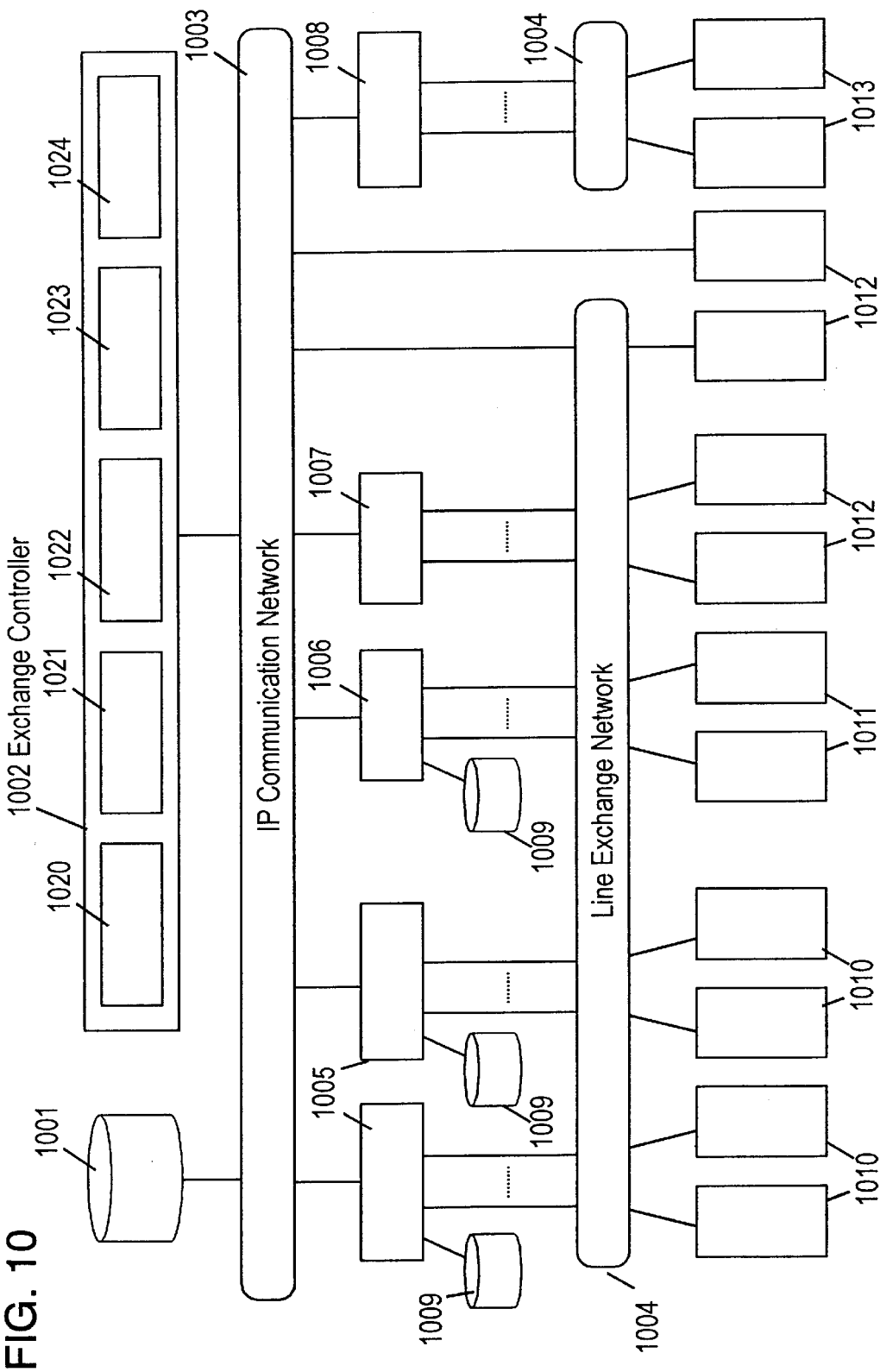
FIG. 10 is a block diagram of data terminals and a service data communication system according to Embodiment 6 of the present invention.

FIG. 10 is a block diagram of data terminals with a service data communication system according to Embodiment 6 of the present invention. Digital communication protocol terminals B 1012 exchanges data with a digital communication protocol. The Internet protocol (IP) widely used is a type of the digital communication protocol. The data terminal of this embodiment will be described on the basis of the IP. Hence, the data terminal is termed as digital communication protocol terminal hereinafter. Communication network 1003 is based on the digital communication protocol for conveying data and also called an IP communication network. Inter-network link apparatus B 1007 is linked with a digital or analog exchange network 1004 and a relevant line interface for connecting between line exchange network 1004 and IP communication network 1003. In common, inter-network link apparatus B 1007 is equivalent to the access or gateway module of an Internet service provider (ISP). Public telephone terminals 1013 are connected to line exchange network 1004 and work as telephones at the receiver side for receiving a call from the digital communication protocol data terminal. Inter-network link apparatus 1008 for public-telephone-terminal functions to connect between line exchange network 1004 and IP communication network 1003 and thus to call to telephone terminal 1013. Exchange controller 1002 includes identifying means 1021 for identifying the user who dials a call to digital communication protocol terminal B 1012 or telephone terminal 1013 and determines a network address required for calling to enable an IP communication.

For communicating with another digital communication protocol terminal B 1012 or public telephone terminal 1013, terminal B 1012 is connected via line exchange network 1004 and inter-network link apparatus B 1007 or directly via a dedicated line to IP communication network 1003. Exchange controller 1002 drives identifying means 1021 to identify the user and then examines a network address to find the receiver. When the receiver is telephone terminal 1013, controller 1004 calls to telephone terminal 1013 via inter-network link apparatus 1008 for telephone terminals and line exchange network 1004.

Service data provider 1001 provides a variety of service data to IP terminals over the IP communication network. Exchange controller 1002 thus includes service data controlling means 1020 for controlling to transfer the service data from provider 1001 to users. This allows digital communication protocol terminal B 1012 to receive a desired service data while making a call or being connected to another terminal B 1012 or public telephone terminal 1013. For example, when line exchange network 1004 is an analog exchange network to receive a desired service data when calling, it provides the service data over DTMF tones upon identifying the identification number of the caller and the telephone number of a receiver.

Digital communication protocol terminal B 1012 may be IP-connected in multiple modes. For example, terminal 1012 is an IP-connected equipment of either wireless or wired type such as IP based television/telephone terminal or an indirectly IP-connected telephone terminal such as a set-box. Line exchange network 1004 may be Integrated Services digital Network (ISDN), an international public telephone network, a cable modem network, a Digital Subscriber Line (DSL) modem network, or an intranet connected in a single company or organization. Digital communication protocol terminals B 1012 are linked to IP communication network 1003. They may be linked directly by a dedicated line or inter-network link apparatus B 1007 between line exchange network 1004 and IP communication network 1003. IP communication network 1003 maybe an open wide area network or an intranet connected in a single company or organization as long as provides an Internet Protocol (IP) layer over the Open Systems Interconnection (OSI) model. The communication level is not limited to the physical layer, can be the data link layer or the network layer.

The service data provided by Service data provider 1001 is presented based on demanded by a user. The service data may be a home page (HP) data commonly connected over IP, image data, music data, text data, or accessible forms of advertisement data. The forms of service data may be determined when the user contracts with the ISP or a provider who administrates Exchange controller 1002 or when the initial process for communications is commenced for requiring relevant data such as the identification number or the receiver telephone number. The users nay be inquired of their interests and likes in a questionnaire form before selecting the contents of advertisement or news to be provided. Also, it can be determined whether the service data is provided to the user or not at the time. It may be arbitrarily determined when the contents of the service data or a yes or no for providing the service data is determined.

As shown in FIG. 10, digital communication protocol terminals A 1011 are data terminals for connecting to the data communication system. Inter-network link apparatus A 1006 connects between IP communication network 1003 and line exchange network 1004 as well as allowing digital communication protocol terminals A 1011 to be dedicated to the data communication system. Digital communication protocol terminal B 1012 has to cooperate directly with exchange controller 1002 via inter-network link apparatus B 1007. In comparison, as inter-network link apparatus A 1006 assists communications between exchange controller 1002 and digital communication protocol terminal B 1012, terminal B 1012 can thus be simplified in the arrangement of physical means such as CPU and software means for performing the operation required as the data terminal and increased in the processing speed.

As the system shown in FIG. 10 is utilized significantly for communications, it permits the service data to be accurately delivered to the users. With the help of inter-network link apparatus A 1006 covering a limited area, service data provider 1001 can provide data for the area. When inter-network link apparatus A 1006 is provided in a particular company or organization, data only for the company or organization can be provided by provider 1001. The processing speed can increases by direct transferring the service data from provider 1001. Service data storage apparatus 1009 for storing local service data for a limited service is connected in dedication with inter-network link apparatus A 1006 dedicated to the data communication system and also linked with exchange controller 1002 and service data provider 1001 for updating the stored data. When the service data is a local advertisement data, it may contain information specific to the area and thus please the advertiser.

Public data terminal 1010 has no IP model and is linked to line exchange network 1004 by a public line exchange network interface such as that in the public telephone. Inter-network link apparatus 1005 for public telephone network terminal like public data terminal 1010 is connected by the exchange network interface to exchange network 1004 and at the other end to IP communication network 1003. Link apparatus 1005 includes a modulator/demodulator on its exchange network 1004 side for connecting the digital service data over analog audio bands with public data terminals 1010. Data terminal 1010 also includes a modulator/demodulator for modulating and demodulating data to be exchanged with inter-network link apparatus 1005. The modulator/demodulator in link apparatus 1005 and data terminal 1010 may be replaced by a combination of DTMF tone generator means and DTMF tone detector for communicating over audio bands of data. This allows public data terminals 1010 like digital communication protocol terminals A 1011 to enjoy the merits of both voice communications and data service connection over the data communication system as well as their relevant payment information. Moreover, as inter-network link apparatus 1005 is connected with dedicated service data storage apparatus 1009, it can provide local service data which pleases both the advertisers and the users.

Referring to FIG. 10, exchange controller 1002 further includes terminal type detector 1023. Controller 1002 may carry the following information or drives terminal type detector 1023 to determine the type of a data terminal to be connected.

(a) Types of the data terminals including digital communication protocol terminal B 1012, digital communication protocol terminal A 1011, and public data terminal 1010;

(b) Forms of the service data to be received by the users at their respective data terminals; and (c) Other data attributed to the data terminals including the quantity of data to be displayed at once and, when LCD is employed for displaying, the color or monochrome mode of the display.

Consequently, the service data can be supplied to each data terminal in its optimum form.

As shown in FIG. 10, receiver-side-advertisement-display-examining means 1024 is provided for examining whether or not an advertisement is displayed to the receiver. In the communication system, advertisement data is provided only to data terminals 1010, 1011, and 1012 at the caller side. That is because the receiver can rarely identify the caller or can hardly recognize which situation a communication is performed under. In general, as the users passively utilize the data communication system, advertisement data is not transferred to the receiver. When the charge for communications is covered by advertisement data on both the caller side and the receiver side, the users enjoy more benefit.

(Embodiment 7)

Figure 11:
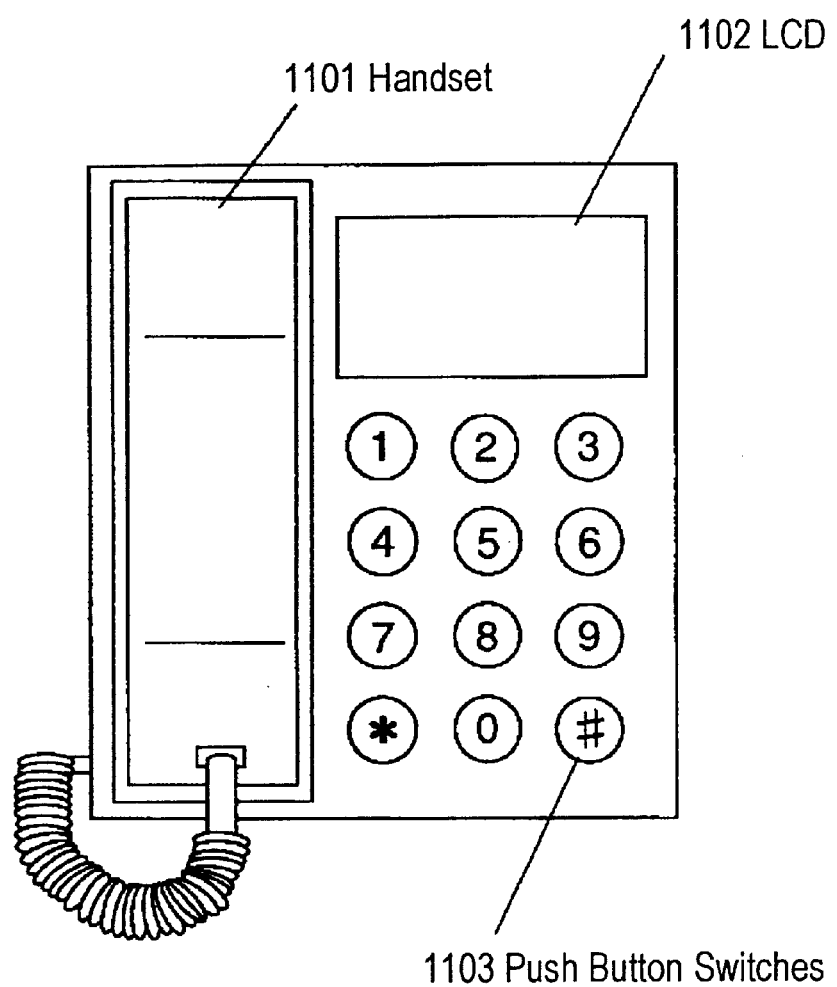
FIG. 11 is a schematic diagram of a data terminal according to Embodiment 7 of the present invention.

FIG. 11 is a schematic view of a data terminal in the form of a telephone according to Embodiment 7 of the present invention. Handset 1101 is also used as a public telephone set. LCD 1102 displays telephone numbers, communication data between data terminals, and service data including advertisement. The action of data terminal 1011 is controlled with an array of push-button switches 1103.

The service data received from exchange network 1004 is displayed on LCD 1102.

(Embodiment 8)

Figure 12:
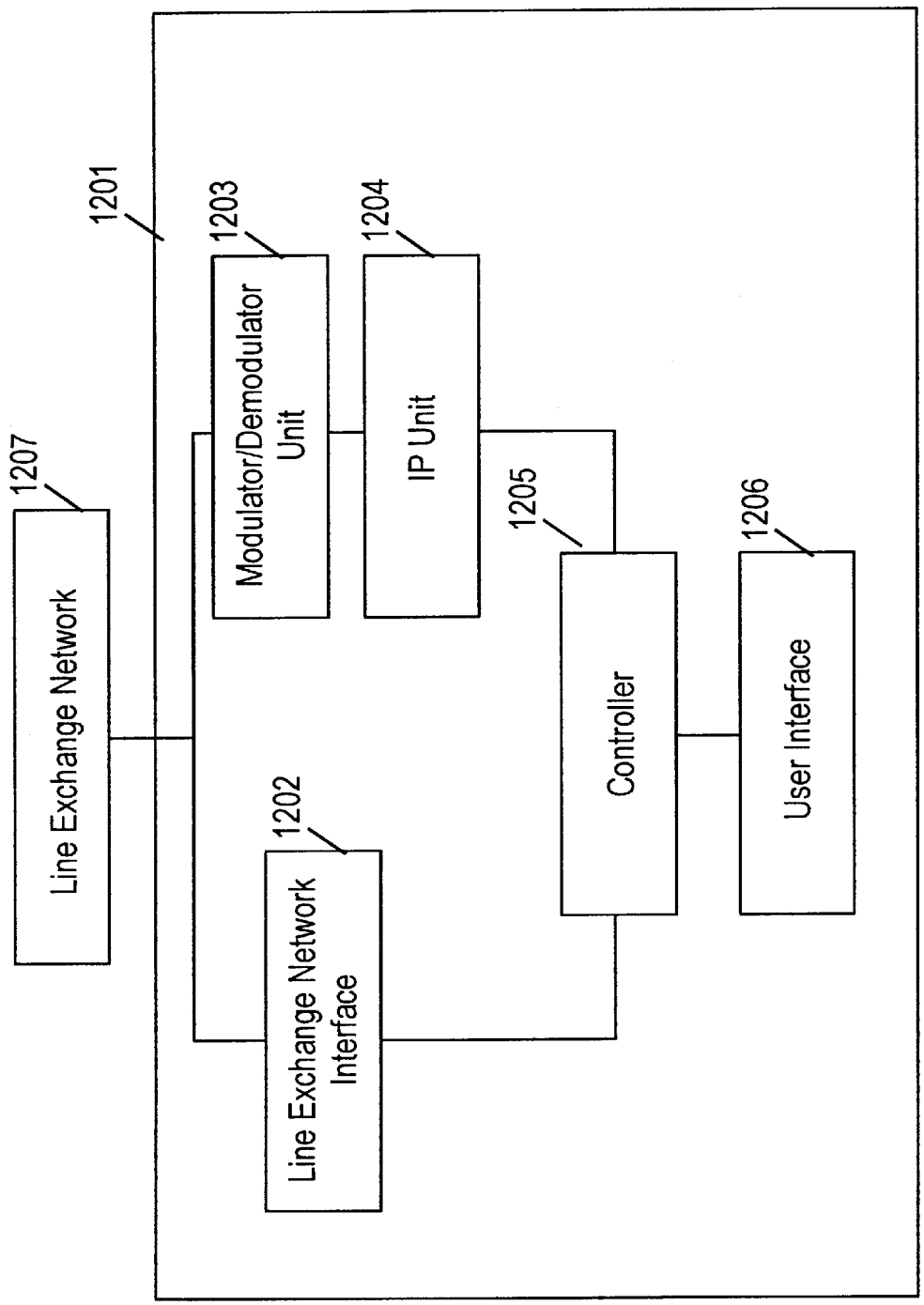
FIG. 12 is a block diagram of a digital communication protocol data terminal according to Embodiment 8 of the present invention.

FIG. 12 is a block diagram of an arrangement of a digital communication protocol data terminal according to Embodiment 8 of the present invention. Digital communication protocol data terminal 1201 comprises:

(a) line exchange network interface 1202 for connecting with line exchange network 1207;

(b) modulator/demodulator unit 1203 linked to line exchange network 1207 and including a modulator for transmitting digital data in an analog audio signal band and a demodulator for demodulating received analog audio signal to digital data;

(c) Internet Protocol (IP) unit 1204 for connecting with Point-to-Point Protocol (PPP), which is called dial-up to carry out Internet packet communication, when the digital data is based on IP;

(d) user interface 1206 having interface devices, such as audio data input and output devices, e.g. a microphone and loudspeakers, an LCD, button-switches and a keyboard, for interfacing with the user of data terminal 1201; and (e) controller 1205 for controlling: (1) the calling and the transmission/reception of audio data via line exchange network interface 1202; (2) the digital data received/transmitted via modulator/demodulator unit 1203 and IP unit 1204; (3) the display of data via user interface 1206; (4) the transmission of keyboard-input data; and (5) the input and output of voice.

(Embodiment 9)

Figure 13:
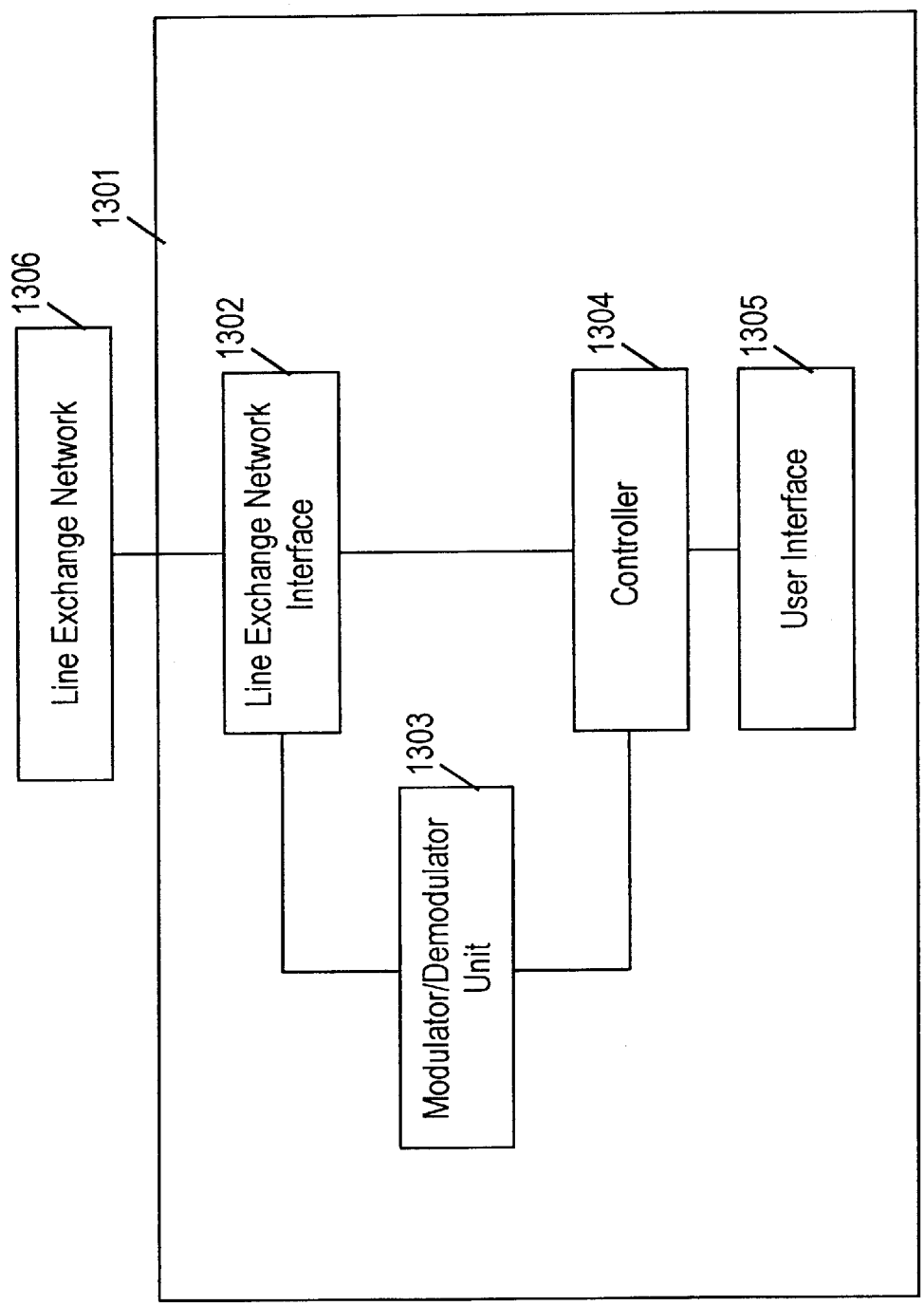
FIG. 13 is a block diagram of a public communication data terminal according to Embodiment 9 of the present invention.

FIG. 13 is a block diagram of a public communication data terminal according to Embodiment 9 of the present invention. Public communication data terminal 1301 comprises:

(a) line exchange network interface 1302 for connecting with circuit switching network 1306;

(b) modulator/demodulator unit 1303 linked to line exchange network 1306 and including a modulator for transmitting digital data in an analog audio signal band and a demodulator for demodulating received analog audio signal to digital data;

(c) user interface 1305 having interface devices, such as audio data input and output devices, e.g. a microphone and loudspeakers, an LCD, button-switches and a keyboard, for interfacing with the user of data terminal 1301; and (d) controller 1304 for controlling: (1) the calling and the transmission/reception of audio data via line exchange network interface 1302; (2) the digital data received/transmitted via modulator/demodulator unit 1303; (3) the display of data via user interface 1305; (4) the transmission of keyboard-input data; and (5) the input and output of voice.

Data terminal 1301 may further comprise a DTMF tone generator/detector unit for generating and detecting a DTMF tone. In that case, modulator/demodulator unit 1303 may be eliminated.

(Embodiment 10)

Figure 14:
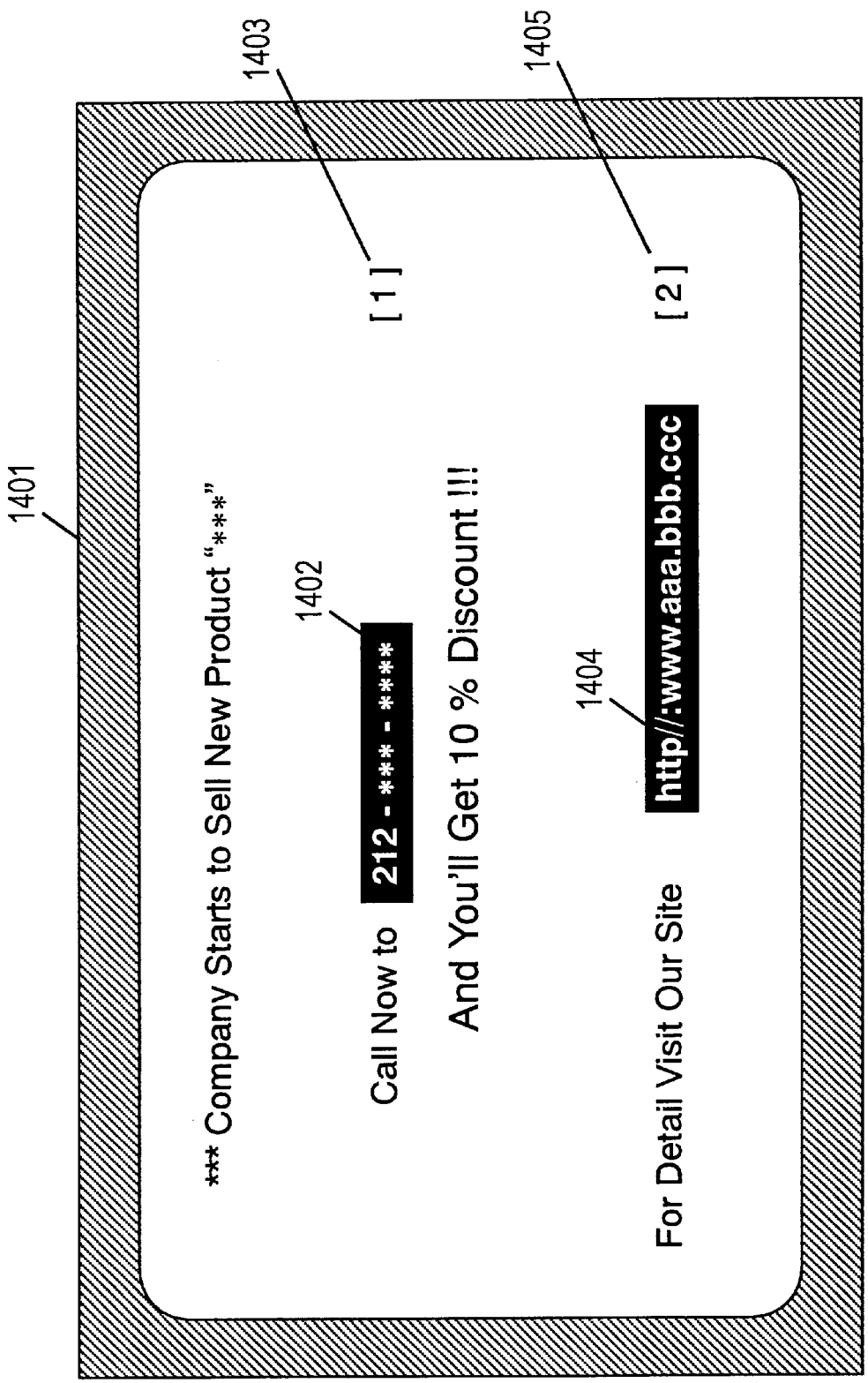
FIG. 14 is a displayed image on a liquid crystal display (LCD) of a data terminal according to Embodiment 10 of the present invention.

FIG. 14 illustrates an image on a liquid crystal display (LCD) of a data terminal according to Embodiment 10 of the present invention. LCD display image 1401 is an example of the service data. Reversed monochrome region 1402 is linked to the telephone number in the service data. Keyboard 1403 is used for dialing the telephone number. Another reversed monochrome region 1404 indicates the address of a home page (HP). Keyboard 1405 is used for browsing the address. Since they are just examples, their display modes and actions are not limited to the examples.

The action of the data terminal according to any of Embodiments 6 through 9 while showing the above images will now be explained. It is assumed that the data terminal shown in FIG. 11 is digital communication protocol terminal A 1011. For starting a call from data terminal A 1011, a handset is picked up, and button-switches 1103 are pressed for accessing inter-network link apparatus A 1006. Controller 1205 controls a call via user interface 1206, connecting line exchange network 1207 via line exchange network interface 1202 to make a call-connection through inter-network link apparatus A 1006. Once the connection has been established, IP unit 1204 and modulator/demodulator unit 1203 turn the connection to a Point-to-Point Protocol (PPP) for transmitting data in an IP packet form. Inter-network link apparatus A 1006 generates drives a guidance generator (not shown) to generate a guidance for promoting to transmit the identification number of link apparatus A 1006 and the receiver number. Link apparatus A 1006 converts the guidance into an IP packet form and delivers it to digital communication protocol terminal A 1011 via line exchange network 2107. In response, controller 1205 in terminal A 1011 returns back the guidance to audio data which is then perceived from the user of handset 1101 via user interface 1206. Then, the identification number and the receiver number are registered with push-button switches 1103 and transferred to inter-network link apparatus A 1006 in the form of IP packets.

After the relevant initial data are exchanged between link apparatus A 1006 and data terminal A 1011, exchange controller 1002 determines the inter-network link apparatus for communicating with the receiver allowing IP packet communications between two inter-network link apparatuses. The inter-network link apparatus for communicating with the receiver transfers a call via the line exchange network to the data terminal at the receiver. During the initial process, service data storage apparatus 1009 delivers advertisement data via inter-network link apparatus A 1006 to data terminal A 1011 in which controller 1205 controls user interface 1206 to display the advertisement data on LCD 1102 as shown in FIG. 14. The received data such as advertisement may be stored in a memory and reviewed when desired. This allows the user to review the advertisement data through operating push-button switches 1103 after finished the call and, if desired, make a call to the telephone number displayed in the advertisement. The receipt and display of the advertisement data is charged to the advertiser partially or entirely for the communication. Alternatively, the advertiser may be charged when the telephone number in the advertisement is accessed by the user.

While the above action is just an example, the connection between digital communication protocol terminal A 1011 and inter-network link apparatus A 1106 or the procedure of the guidance may be modified if desired. Also, the display image of an advertisement data or a service data may be varied depending on the applications.

While the service data is displayed on LCD 1102 in Embodiment 10, it may be notified with a color LED, sounds, vibrations, or the like.

The present invention is not limited to the data terminals of the foregoing embodiments. The type and the number of physical layers such as circuit interface are not limited, either. The procedure from starting a call to displaying an advertisement is described in this embodiment, but a communication procedure is not limited to the above procedure. Received service data may be utilized in the form of texts or images depending on the type of the data terminal.

(Embodiment 11)

Figure 15:
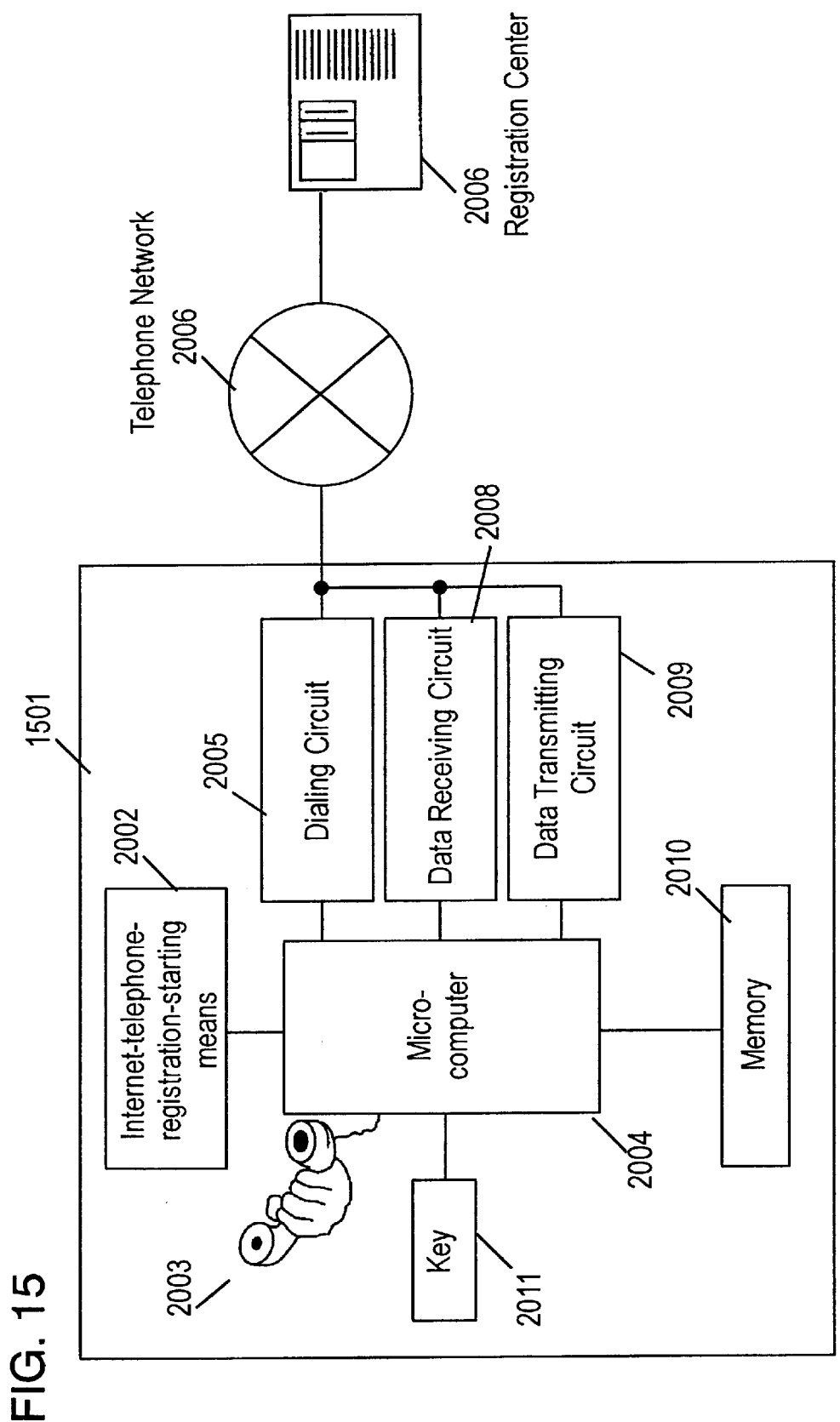
FIG. 15 is a schematic diagram of an Internet-accessible telephone and a registration system according to Embodiment 11 of the present invention.

FIG. 15 is a diagram showing a Internet-accessible telephone and a register system according to Embodiment 11 of the present invention. The system comprises:

(a) Internet-accessible telephone 1501;

(b) Internet-telephone-registration-starting means 2002 operable with dedicated push-button switches or menu display;

(c) handset 2003;

(d) microcomputer 2004 for controlling the action of the entire system;

(e) dialing circuit 2005;

(f) telephone network 2006;

(g) Internet telephone registration center 2007;

(h) data receiving circuit 2008 for receiving DTMF signals or simple modem signals, such as V.23 signals, for notifying the caller number;

(i) data transmitting circuit 2009;

(j) memory 2010 for saving registration data received from registration center 2007; and (k) keyboard 2011.

Figure 16:
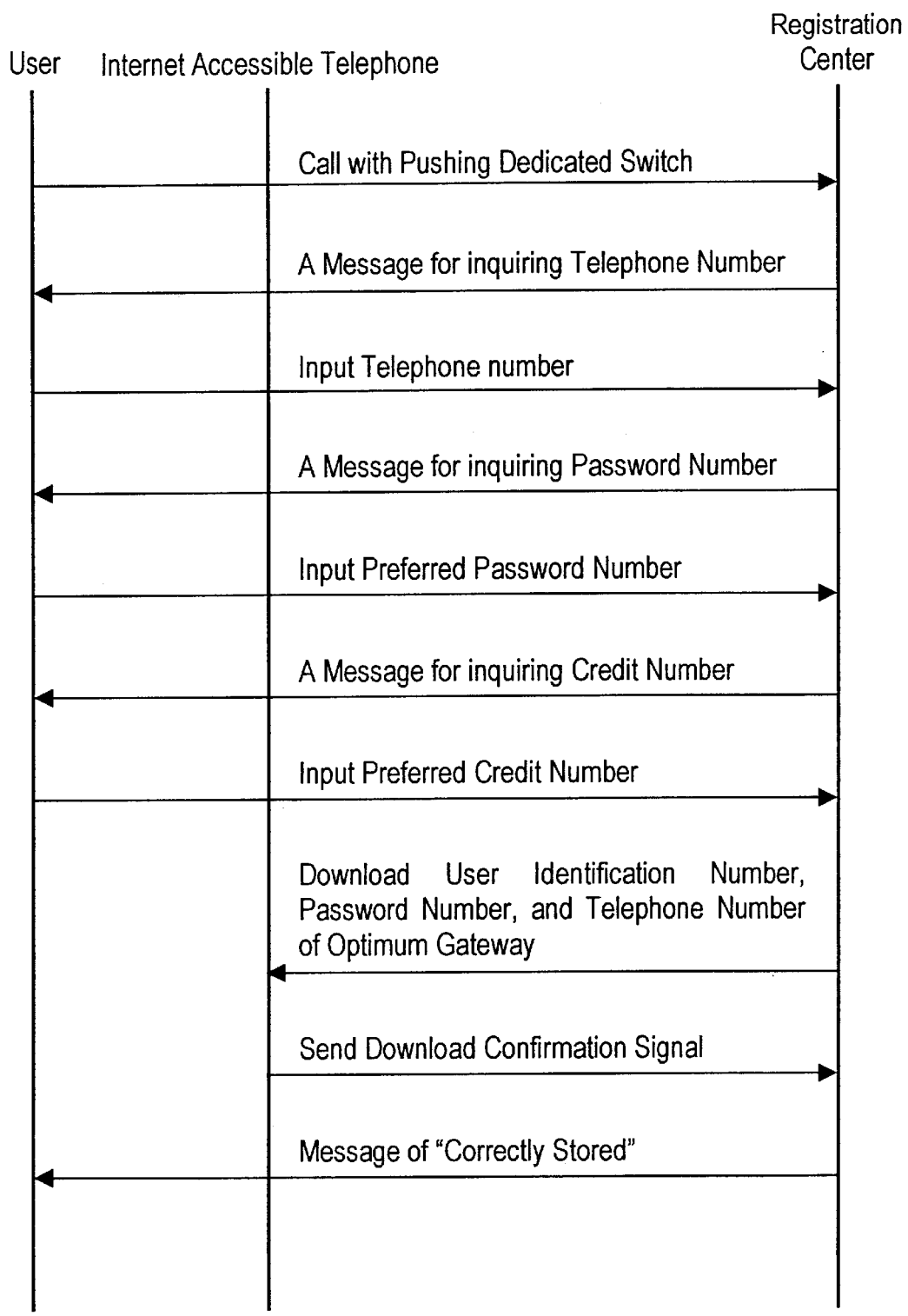
FIG. 16 is a diagram showing a sequential action between the Internet-accessible telephone and the registration center according to Embodiment 11.

FIG. 16 is a diagram of a sequential action between the Internet-accessible telephone and the registration center in Embodiment 11 of the present invention. The system will be described in more detail referring to FIGS. 15 and 16. For starting a registering action, Internet-accessible-telephone-registration-starting means 2002 is actuated by a user with the dedicated push-button switches or a displayed menu. In response, microcomputer 2004 drives dialing circuit 2005 to dial the number of registration center 2007 stored in memory 2010 for automatically making a call. The call is then transferred via telephone network 2006 to registration center 2007. Registration center 2007 replies a message for inquiring a telephone number to be registered. The telephone number to be registered can be input with keyboard 2011. Based on the input telephone number, the telephone number of an optimum gateway to the user is determined. In common, the gateway optimum to the user makes the user spend the lowest communication charge. The user telephone number may automatically be identified by registration center 2007 with a caller-number-notifying service. Then, the user receives another message for inquiring a password number and inputs the password number with keyboard 2011. Moreover, the user receives a further message for inquiring his/her credit card number and inputs the credit card number.

The above procedure of inputting data is just an example and may be modified with more steps or less steps.

When the above initial setting has been completed, messages and data including the user identification number, the password number, and the telephone number of an optimum gateway are downloaded from registration center 2007. More specifically, the data is received by data receiving circuit 2008 and stored in memory 2010. After the data is correctly stored, a download completion signal is transmitted from data transmitting circuit 2009 to registration center 2007. Upon receiving the download completion signal, registration center 2007 releases a message, e.g. "Correctly stored". Accordingly, telephone 1501 automatically stores the data including the user identification number, the password number, and the telephone number of an optimum gateway. The data is applied for an automatic transmission when telephone 1501 is used as the Internet-accessible telephone. As telephone 1501 is automatically set as Internet-accessible telephone, it can easily be handled by those who are not familiar with the initial setting. Any telephone with no display can equally be initialized for an Internet connection.

(Embodiment 12)

Figure 17:
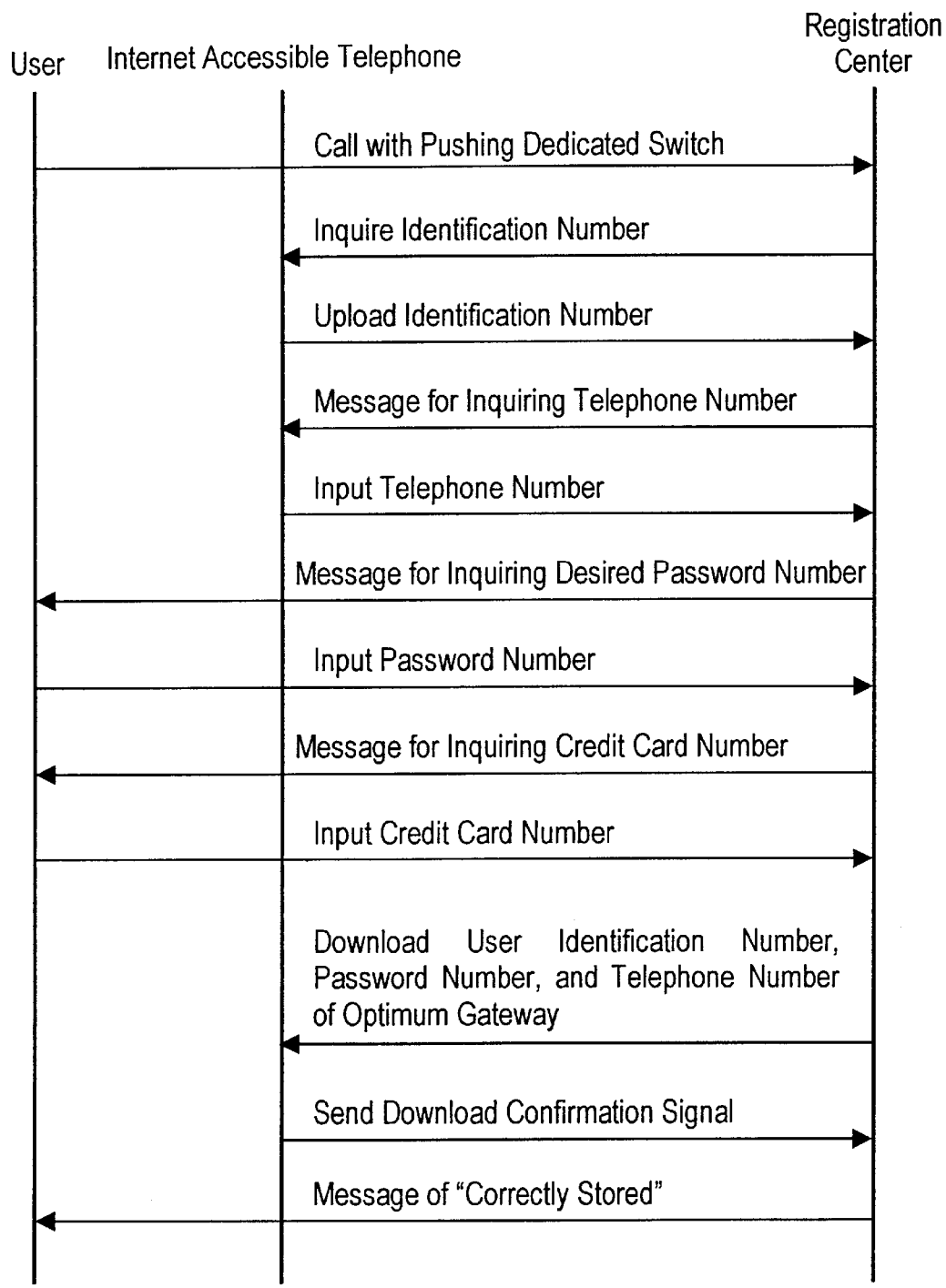
FIG. 17 is a diagram showing a sequential action of reading the identification number of each Internet-accessible telephone according to Embodiment 12 of the present invention.

FIG. 17 is a diagram showing a sequential action of reading the identification number of an Internet-accessible telephone according to Embodiment 12 of the present invention. A telephone and a registration system are identical to those shown in FIG. 15. FIG. 17 shows registration center 2007 uploading the identification number assigned to and stored in each Internet-accessible telephone 1501. In FIG. 17, as Internet-accessible-telephone-registration-starting means 2002 is actuated with dedicated button switches, an inquiry for uploading of the identification number is released from registration center 2007. The inquiry is received by data receiving circuit 2008. In response, the identification number assigned to the telephone is read out from memory 2010 and transmitted from data transmitting circuit 2009 to registration center 2007 for uploading. The identification number may be uploaded at any point during the sequential action.

Registration center 2007 may upload the identification number regardless of the inquiry for uploading.

When determining that the identification number is valid, and registration center 2007 may discount the communication charge or calculate an incentive margin for the telephone manufacturer.

(Embodiment 13)

Figure 18:
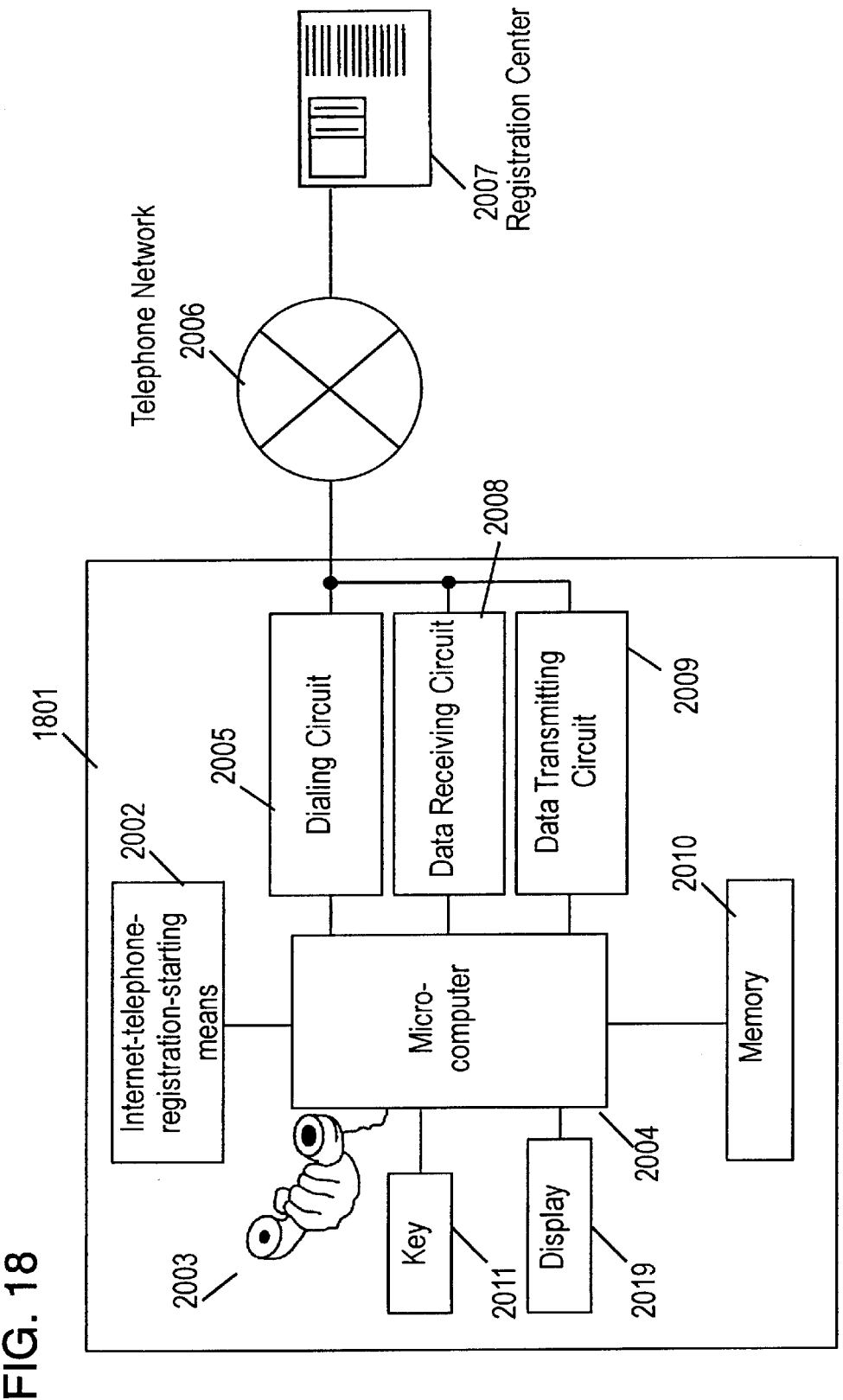
FIG. 18 is a block diagram of an Internet-accessible telephone employing a display according to Embodiment 13 of the present invention.

FIG. 18 is a block diagram of Internet-accessible telephone 1801 employing display 2019 according to Embodiment 13 of the present invention. Display 2019 may be an LCD or the like. In FIG. 18, like components denoted by like numerals as those shown in FIG. 15 are identical in the function.

Figure 19:
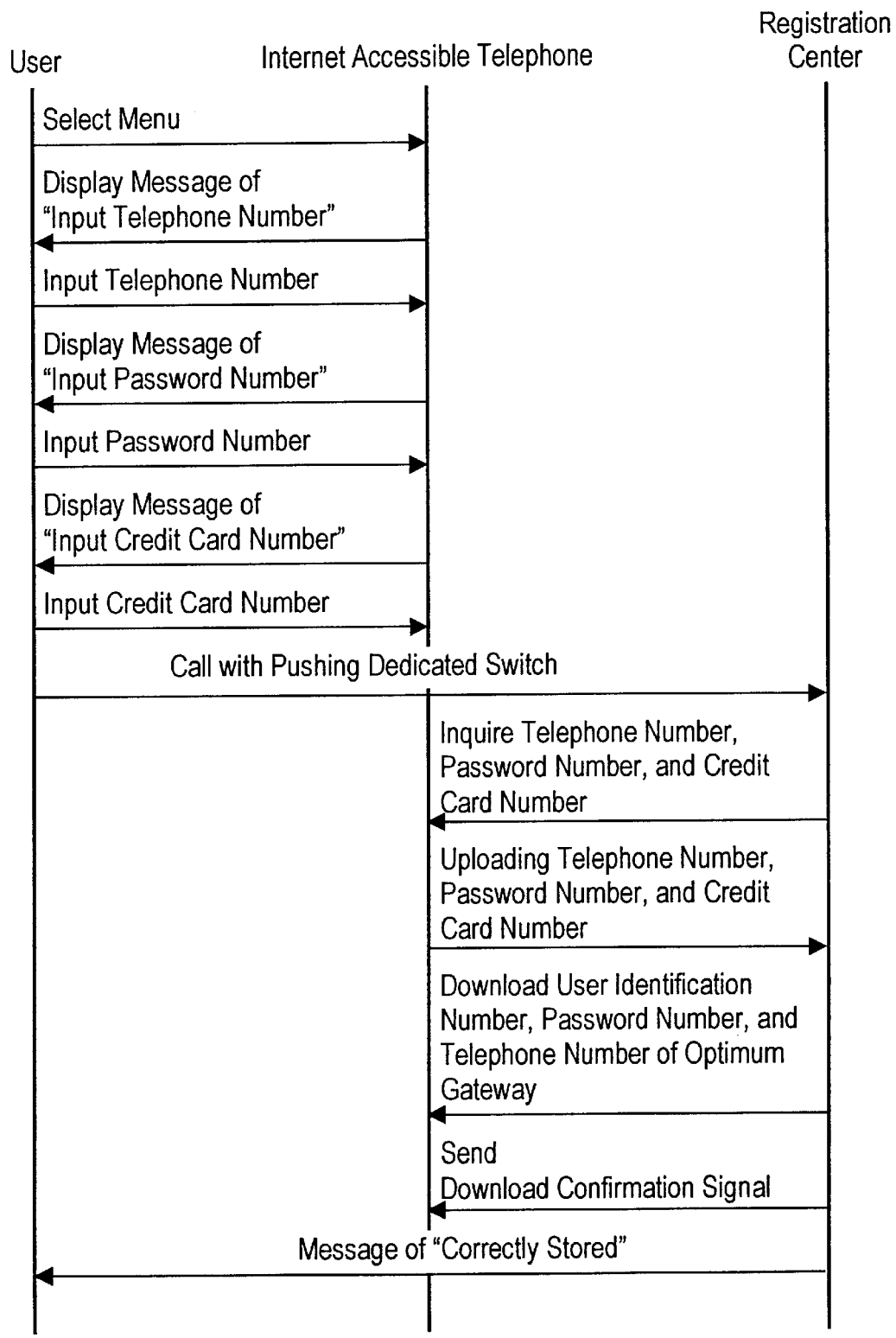
FIG. 19 is a diagram showing a sequential action of transmitting setting data at once according to Embodiment 13 of the present invention.

FIG. 19 is a diagram showing a sequential action of transmitting the setting data at once in Embodiment 13 of the present invention. The user inputs the setting data with display 2019 and keyboard 2011. A menu is selected for preparing the setting of the telephone. When a message "Input Telephone Number" is displayed, the number of telephone 1801 to be set is input. Then, a message "Input Password Number" is displayed, and then, a desired form of the password number is input. Following to the message of "Input Credit Card Number", the user inputs the credit card number to be registered. This setting is just an example and may be modified.

After the setting is completed, Internet-accessible-telephone-registration-starting means 2002 is actuated with dedicated button switches or a menu screen. Then, microcomputer 2004 controls dialing circuit 2005 to dial the number of registration center 2007 stored in memory 2010 for an automatic call. The call is received via telephone network 2006 by registration center 2007. Then, registration center 2007 release a message for inquiring the uploading in the form of a modem signal or a Dial Tone Multiple Frequency (DTMF) signal. In response, telephone 1801 automatically upload the telephone number, the password number, and the credit card number. During uploading, the credit card number may be encrypted for protecting the number from ripped off. Telephone 1801 then downloads a data including the user identification number, the password number, and the telephone number of an optimum gateway from registration center 2007 which has uploaded the data of telephone 1801. After the data is correctly downloaded, telephone 1801 transmits a download completion signal to registration center 2007. As telephone 1801 uploads the data at once within a short period of time, a duration during the line to registration center 2007 is busy can be minimized, and thus, more complex setting data can be transmitted. Also, since a critical portion of the data is encrypted, it is protected from ripped off.

(Embodiment 14)

Figure 20:
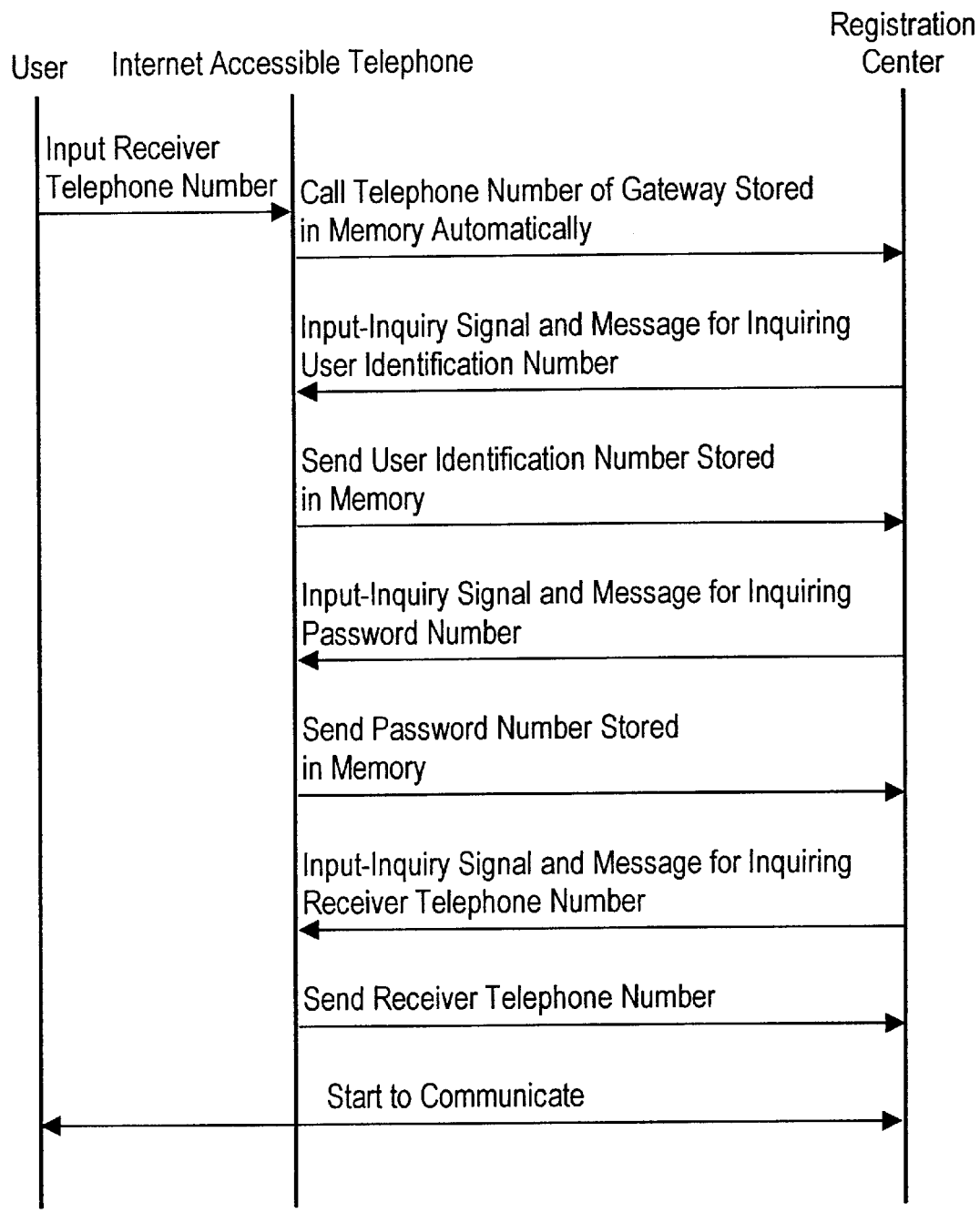
FIG. 20 is a diagram showing a sequential action of automatically starting an Internet telephone call according to Embodiment 14 of the present invention.
Figure 21:
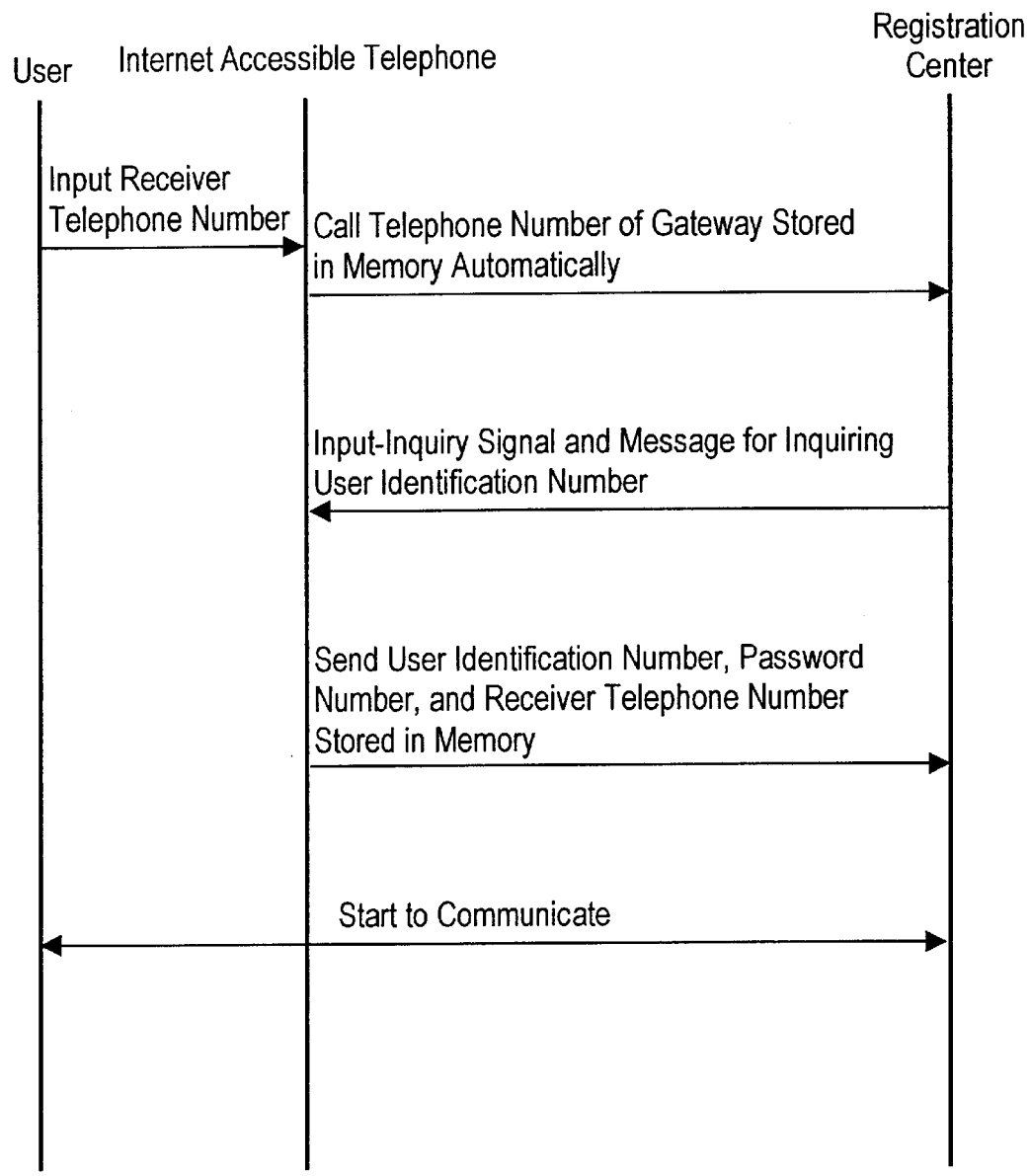
FIG. 21 is a diagram showing a sequential action of transmitting data at once to start the Internet telephone call in Embodiment 14.
Figure 31:
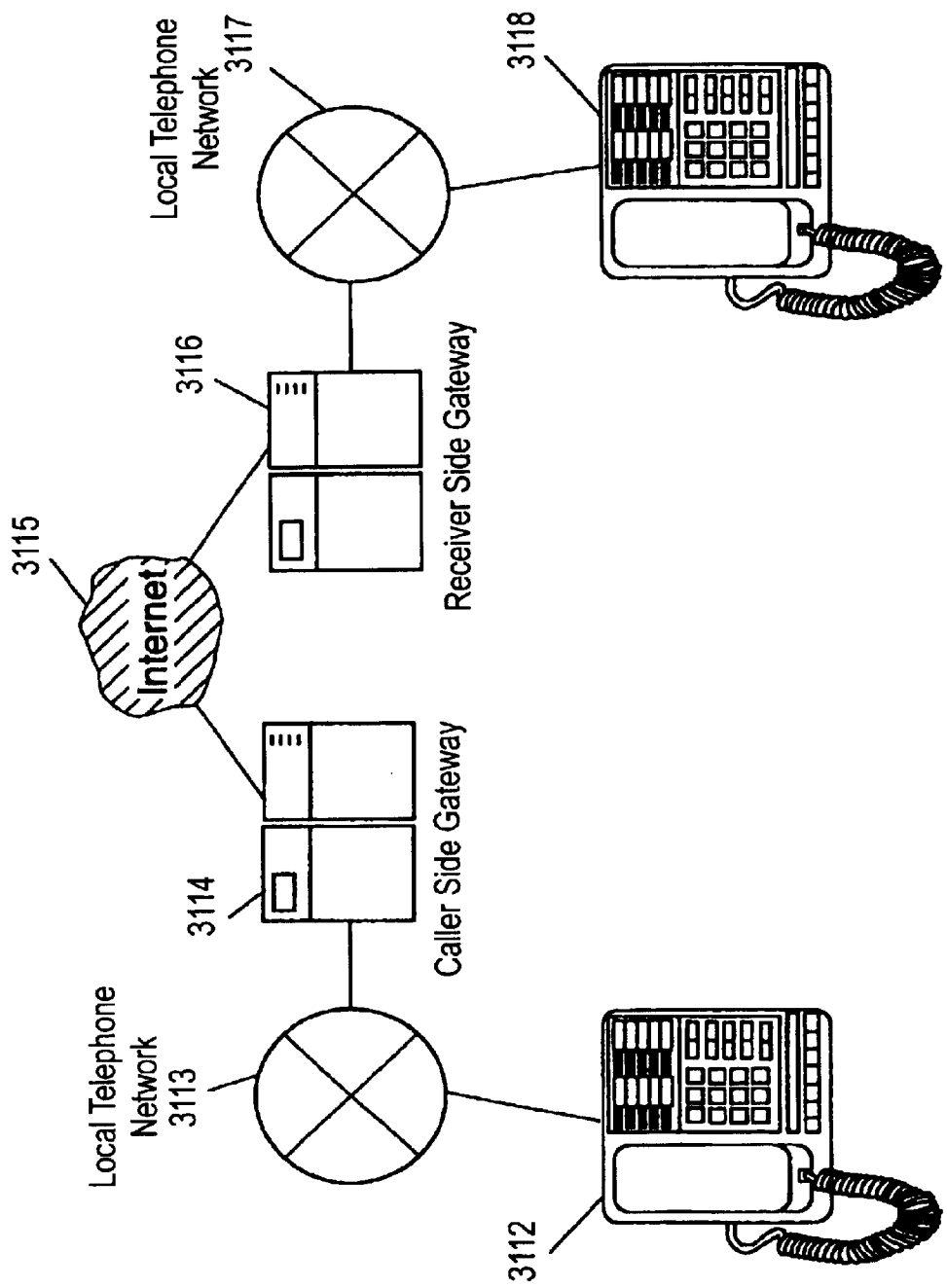
FIG. 31 is a schematic diagram of a conventional Internet-accessible telephone connected to a gateway.
Figure 32:
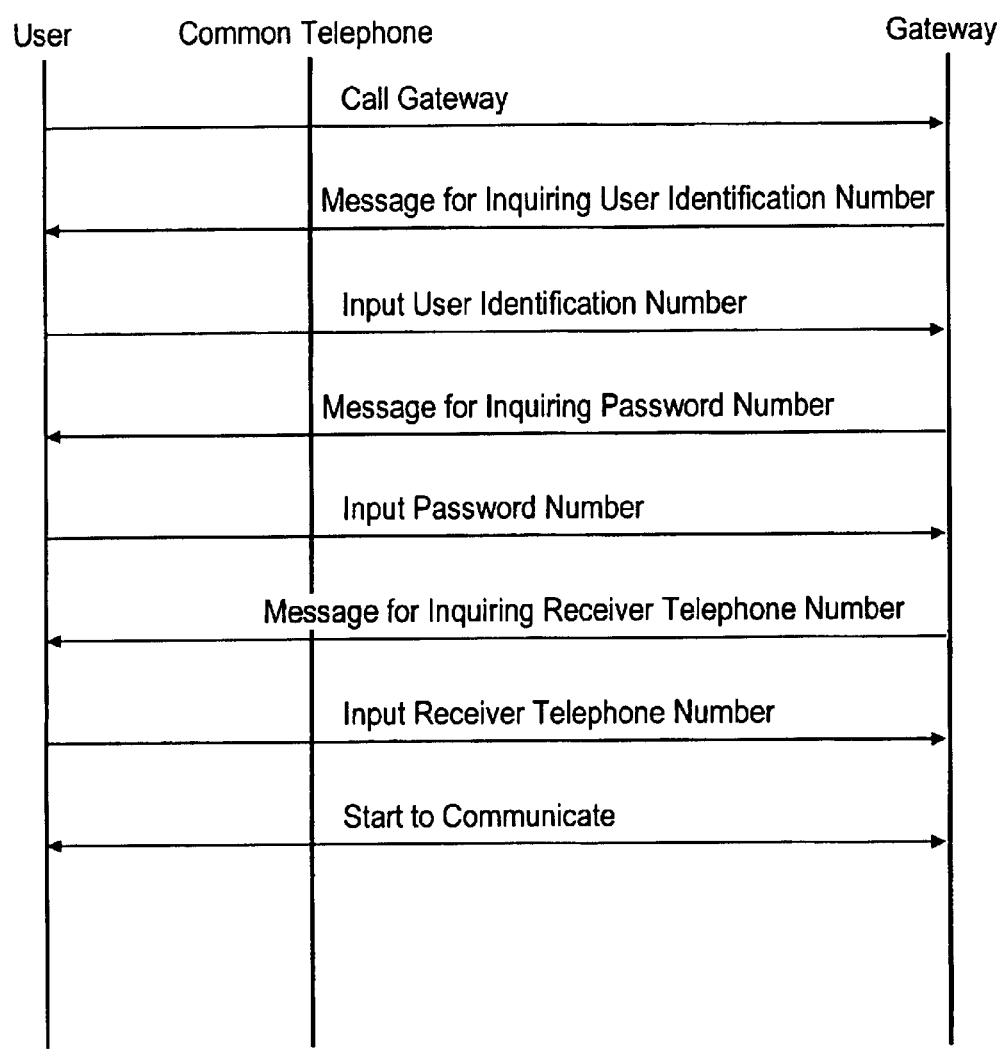
FIG. 32 is a diagram of a sequential action of the conventional Internet-accessible telephone.

Embodiment 14 is a system where registration center 2007 shown in FIG. 18 is replaced by caller side gateway 3114 like that shown in FIG. 31. FIG. 20 is a diagram showing a sequential action of automatically operating an Internet telephone in Embodiment 14. A user firstly dial a receiver number on Internet-accessible telephone 1801. Internet-accessible telephone 1801 automatically calls the number of caller side gateway 3114 saved in memory circuit 2010 in the case: (1) that keyboard 2011 dedicated for Internet-accessible telephone is operated before or after the dialing of the receiver telephone number, or (2) that the dialed number is identical to the receiver telephone number, who is being called for communicating over the Internet. In turn, gateway 3114 releases a message for inquiring the user identification number and its input-inquiry signal. The input-inquiry signal can be a DTMF signal form or a modem signal form and received by data receiving circuit 2008. Upon receiving, telephone 1801 automatically reads out the user identification number from memory 2010 and automatically transmits it in the form of a DTMF or modem signal. Then, telephone 1801 receives a message for inquiring a password number and a input-inquiry signal. Similarly in this case, telephone 1801 automatically reads out and transmits the password number saved in memory 2010. Finally, telephone 1801 receives a message for inquiring the receiver telephone number and its input-inquiry signal. In response, telephone 1801 automatically transmits the receiver telephone number dialed by the user. If telephone 1801 transmits the user identification number followed by the password number and the receiver number as shown in FIG. 21, the overall duration of the sequential action is minimized, and the call starts effectively.

The sequential action of Embodiment 14 is not limited to the described sequence. The input of the user identification number and the password number for accessing the gateway may be eliminated if the gateway utilizes a caller number notifying service.

(Embodiment 15)

Figure 22:
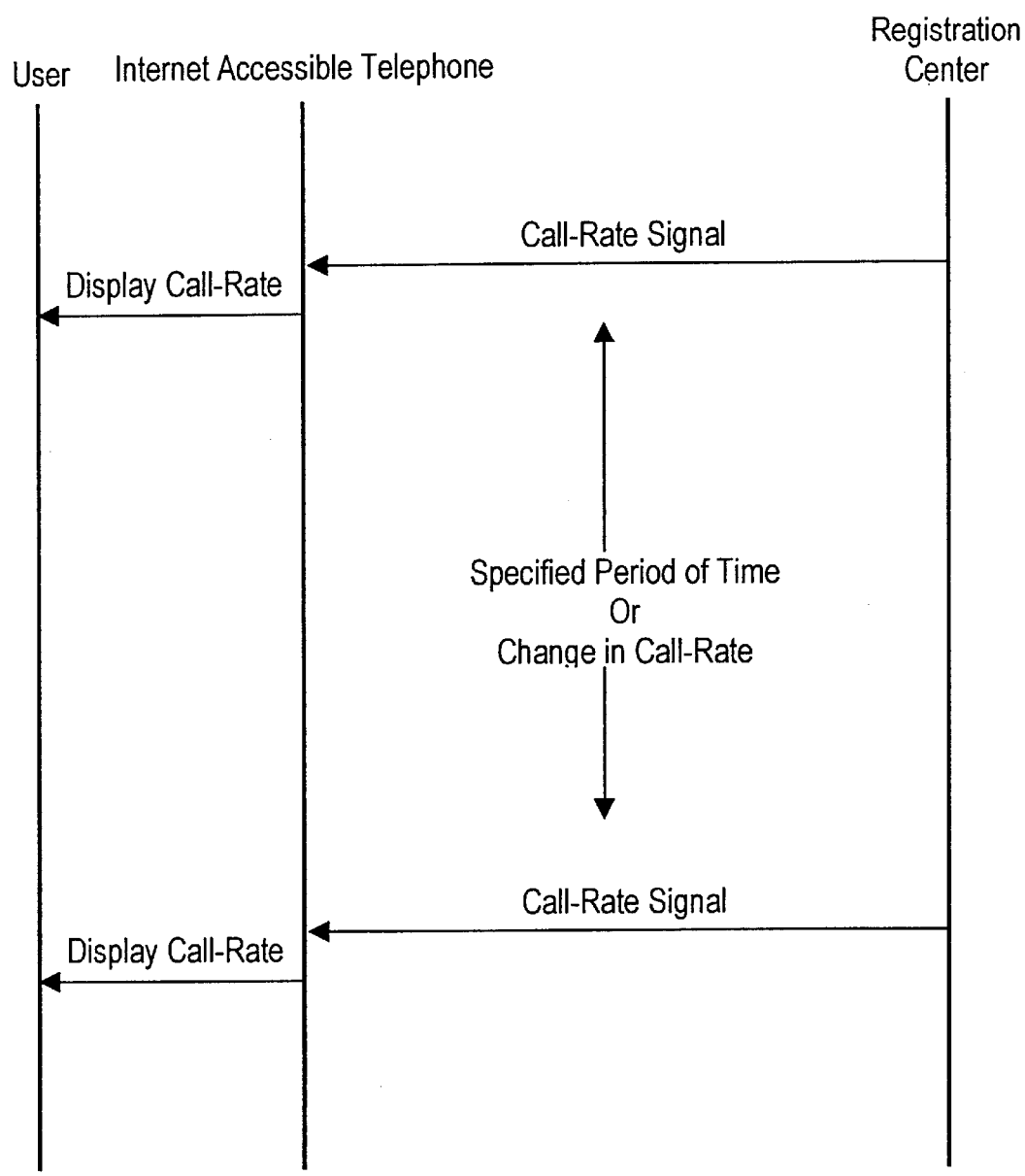
FIG. 22 is a diagram showing a sequential action of transmitting a call-rate signal from a gateway according to Embodiment 15 of the present invention.

Embodiment 15 is a similar system to that of Embodiment 14. FIG. 22 is a diagram showing a sequential action of Embodiment 15. In Embodiment 15, a call-rate is transferred to telephone 1801 every specific period of time or the call-rate is changed. In general, the call-rate is notified by inverting the polarity of a signal on a telephone line. Since connected via public telephone network 2006 to the telephone, caller side gateway 3114 for Internet telephoning cannot send the call rate like on the telephone line. Instead, gateway 3114 sends the rate with a sound.

If the call-rate signal is in a DTMF or modem signal form, it may be mixed up with voice signals and hardly be perceived.

Figure 23:
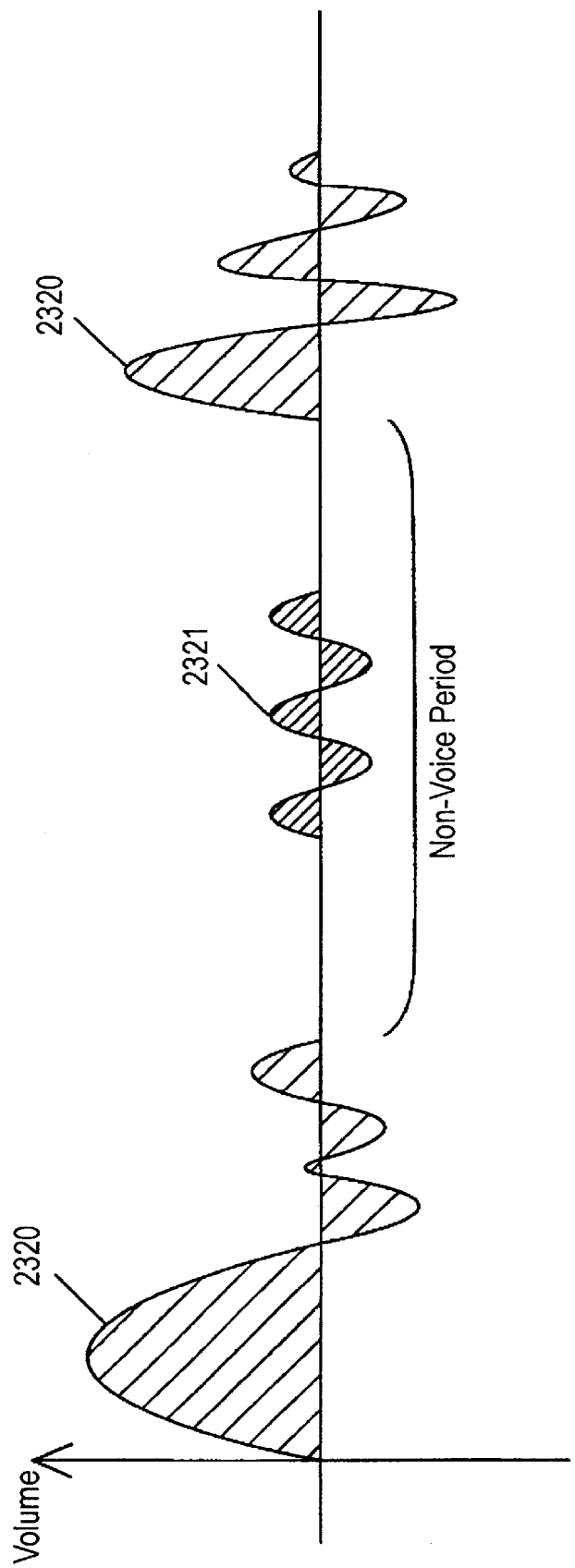
FIG. 23 illustrates a data signal inserted in a non-sound duration of a voice signal according to Embodiment 15.

For the above problem, the call-rate signal is then carried in a no-voice period as shown in FIG. 23. FIG. 23 illustrates voice signals 2320 and a DTMF or modem signal 2321 indicating the call-rate. Caller side gateway 3114 has a buffer for not transferring a voice packet as a voice to public telephone network 3113 immediately after the packet arrived over Internet 3115, and can slightly delay transferring the voice.

Figure 24:
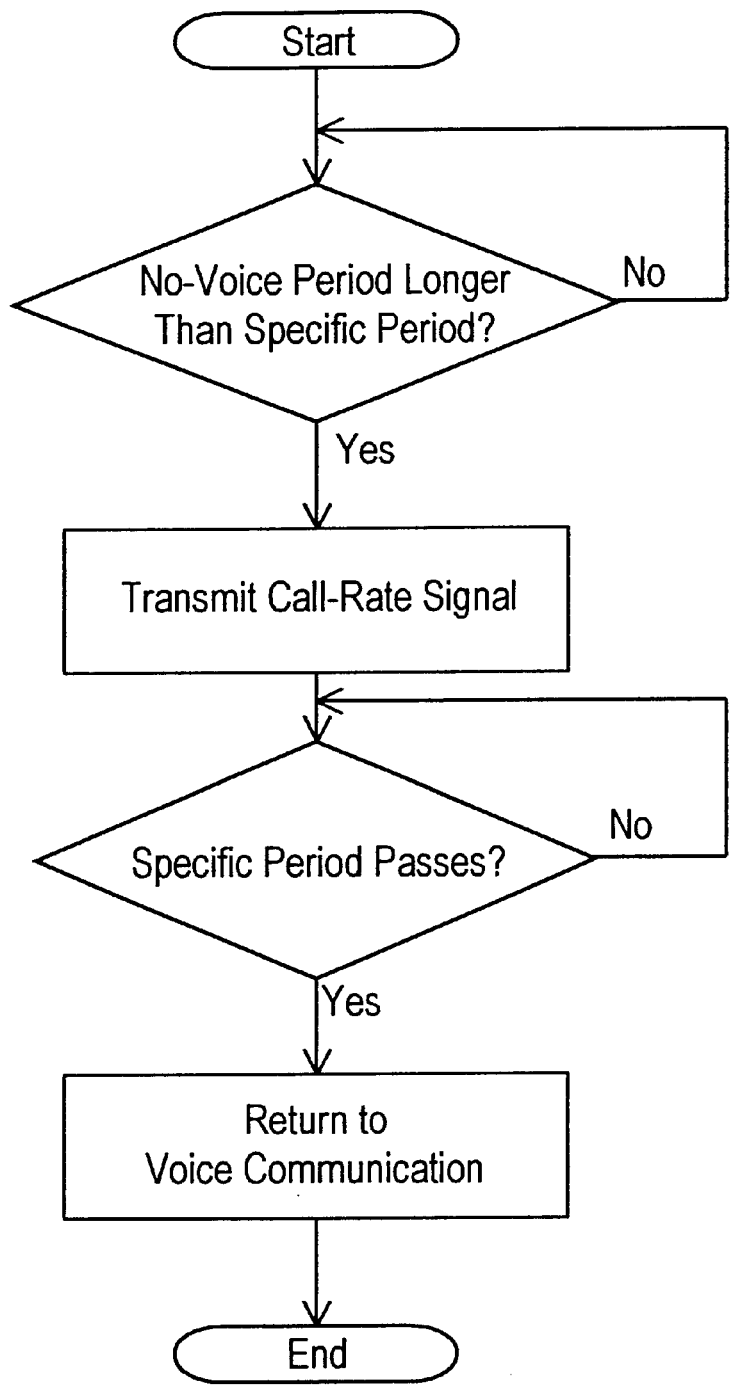
FIG. 24 is a flowchart of inserting the data signal into the non-sound duration according to Embodiment 15.

The action is denoted by a flowchart shown in FIG. 24. First, it is examined whether or not the no-voice period in the signal from the gateway to the telephone exceeds a specified one. When the no-voice period exceeds the specified one, the call-rate signal is released. The voice period is then enabled after another period of time. In case that a voice signal is received at the time, it can be delayed by the buffer for adjusting the succeeding no-voice period. Other data than the call-rate data, such as advertisement data or any data to be delivered to the user, may be transferred by the same manner to the caller telephone. Those data may be delivered upon the caller starts calling.

(Embodiment 16)

Figure 25:
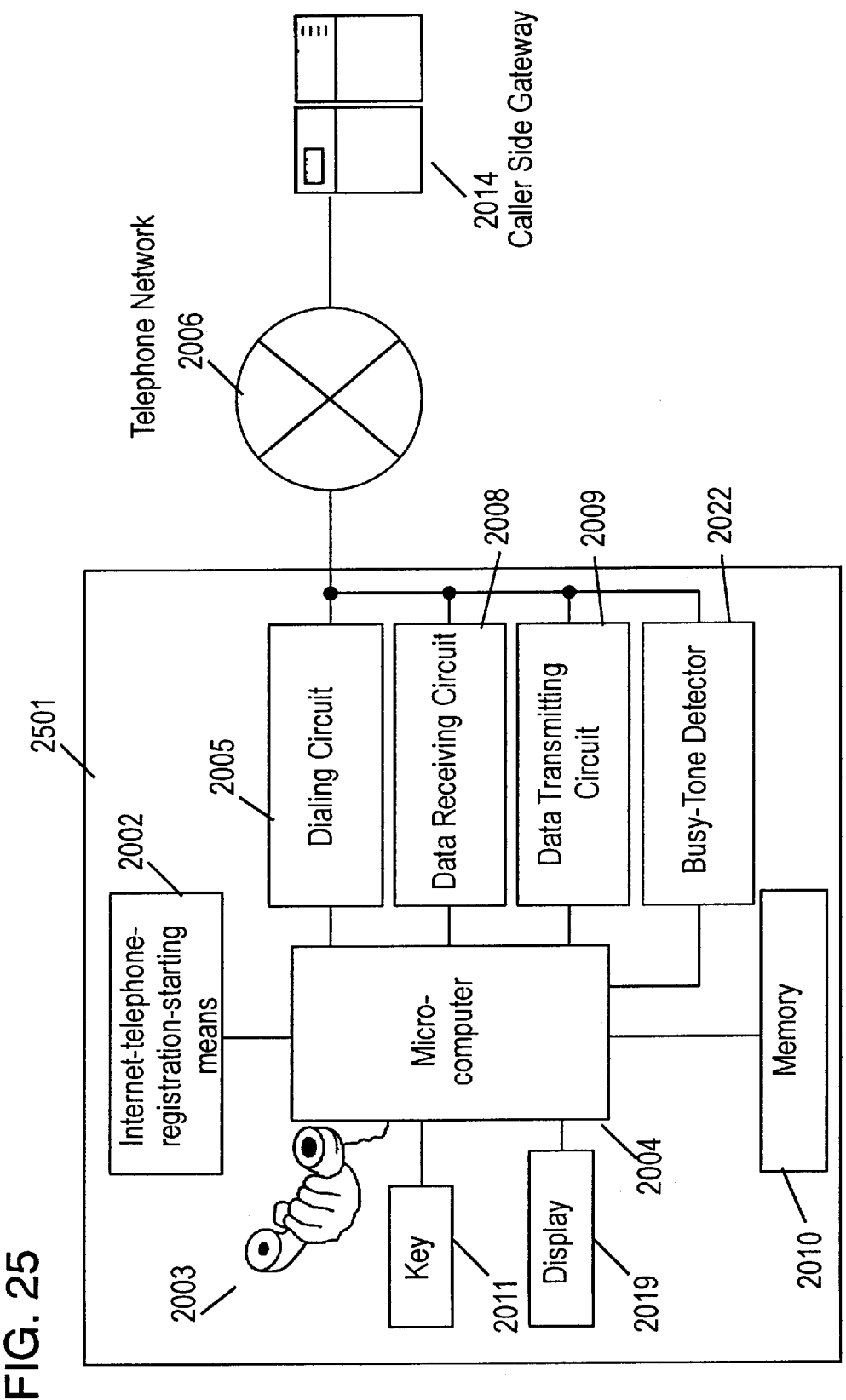
FIG. 25 is a diagram of an Internet-accessible telephone employing a voice detecting circuit according to Embodiment 16 of the present invention.
Figure 26:
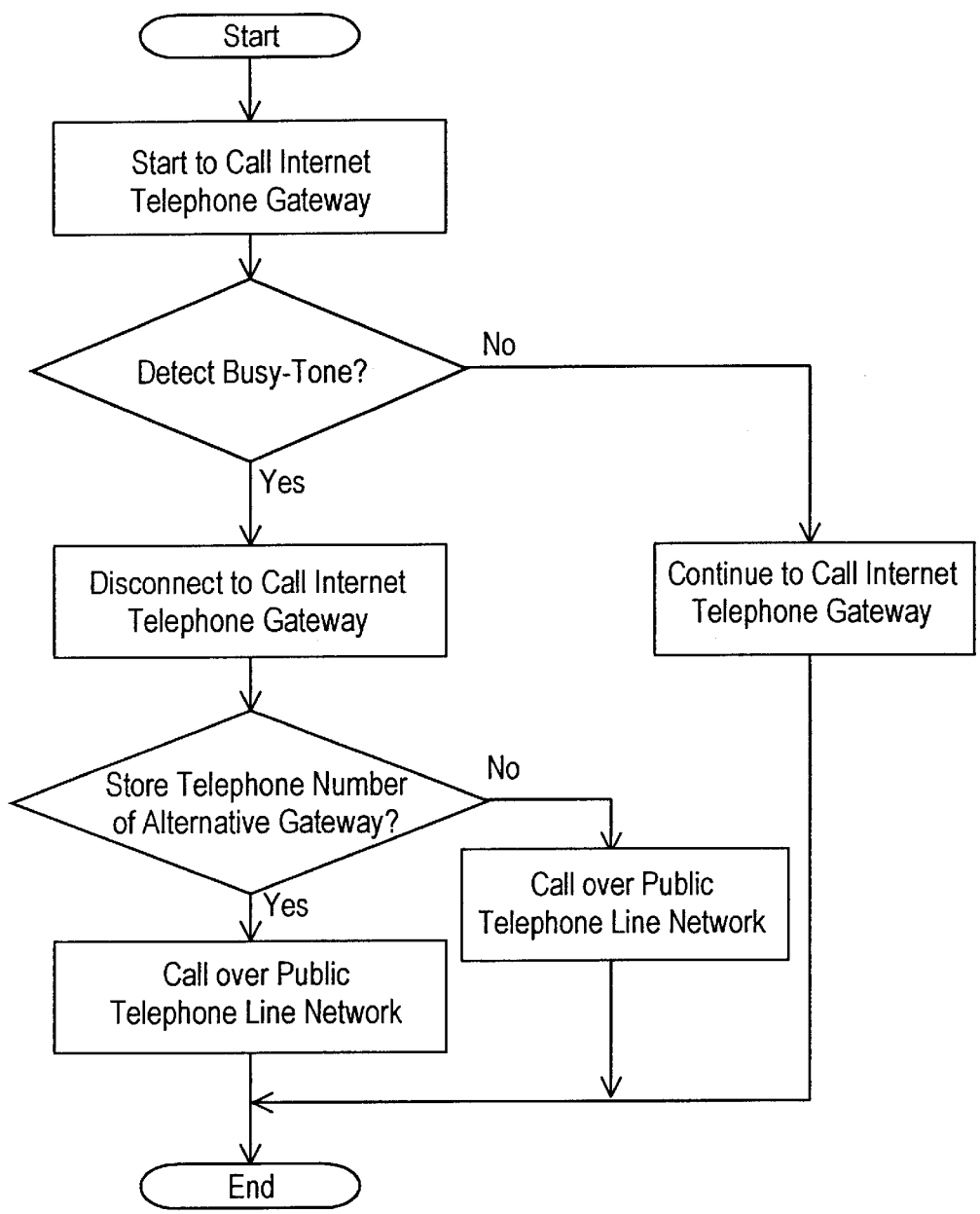
FIG. 26 is a flowchart of an action in the case that an Internet telephone gateway is busy according to Embodiment 16.
Figure 27:
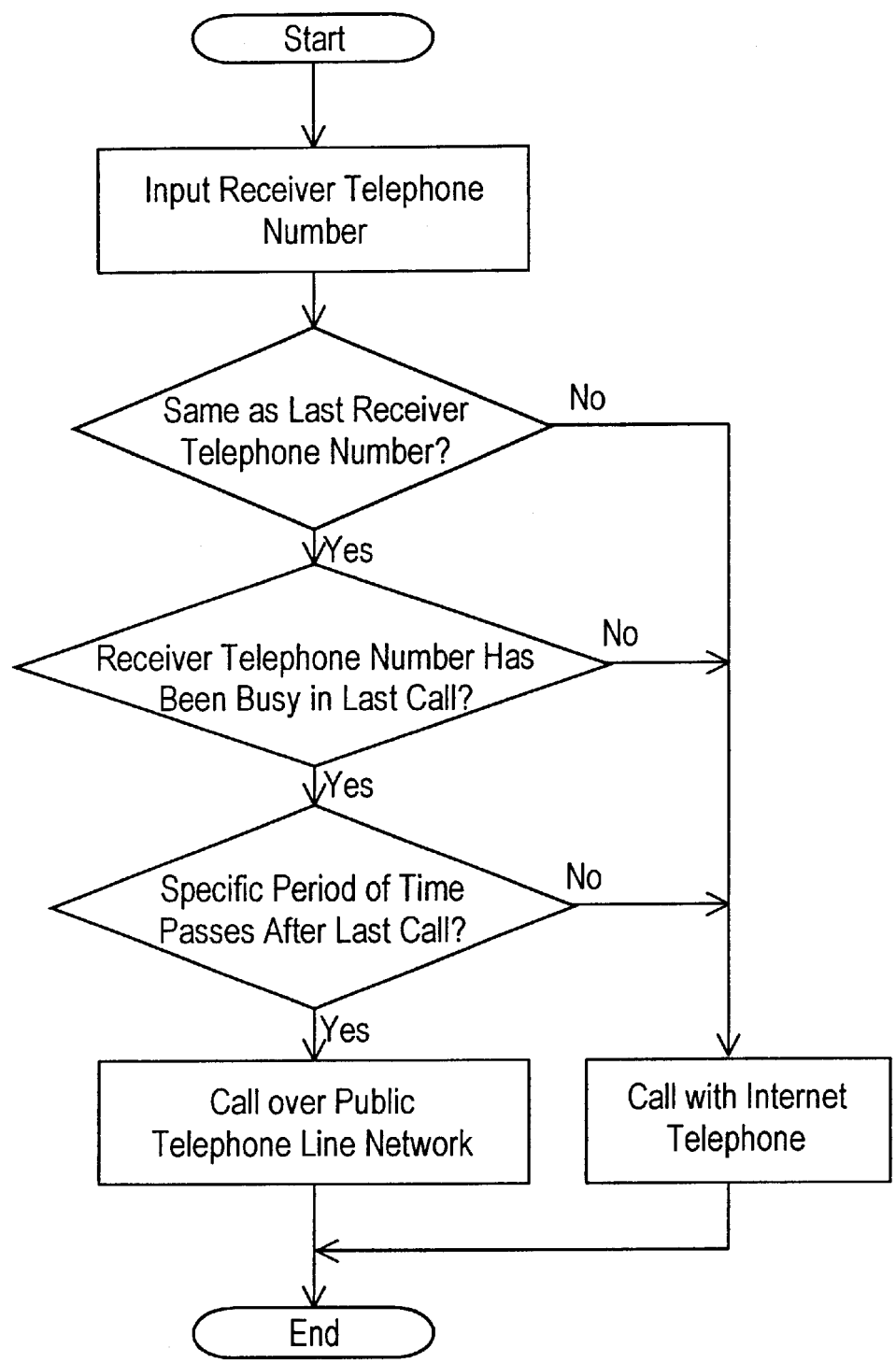
FIG. 27 is a flowchart of an action in the case that a receiver has been busy before a specific period of time according to Embodiment 17 of the present invention.

FIG. 25 is a view of a system with an Internet-accessible telephone 2501, which includes a busy-tone detector, according to Embodiment 16 of the present invention. Busy-tone detector 2011 shown in FIG. 25 is provided for detecting a busy tone on the line. FIG. 26 is a flowchart showing the action of Embodiment 16 when Internet telephoning gateway is busy. First, Internet-accessible telephone 2501 calls caller side gateway 2014. When busy-tone detector 2022 does not detect a busy tone, Internet-accessible telephone calls continuously. If the busy tone is detected, it is then examined whether the telephone stores the telephone number of an alternative gateway or not. When storing, Internet-accessible telephone 2501 automatically disconnects Internet telephone calling and switches to the alternative gateway. If storing no alternative gateway telephone number, the telephone make a call over the public telephone network.

(Embodiment 17)

Figure 28:
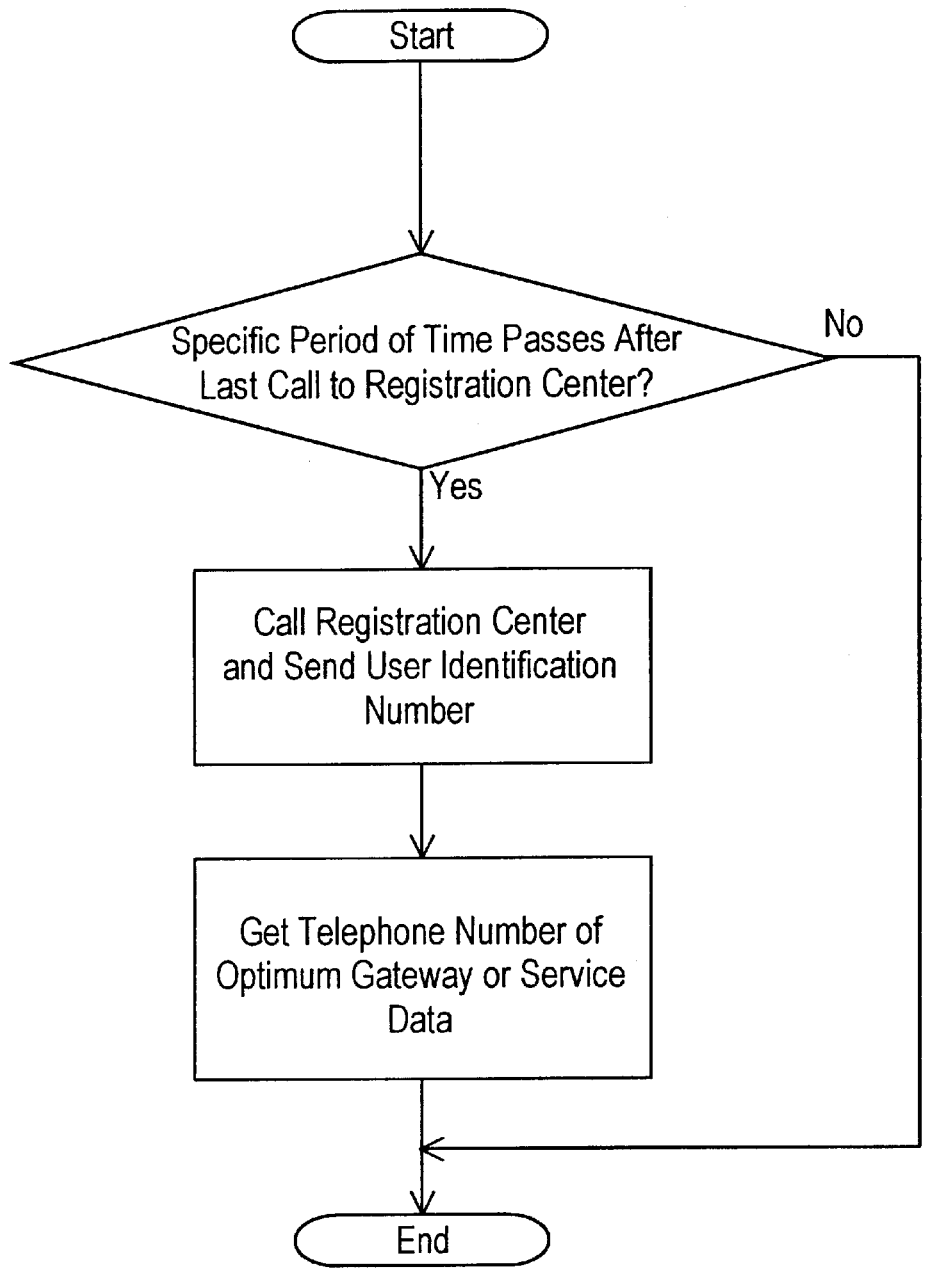
FIG. 28 is a flowchart of an action in the case that a registration center is called at every interval of time according to Embodiment 18 of the present invention.

FIG. 28 is a flowchart showing the action of calling a registration center every specific period according to Embodiment 18 of the present invention. First, Internet-accessible telephone 1801 examines how long a period has passed from the last call to registration center 2007. When the period is not longer than a specific one, the action is terminated. When the specific period has passed, registration center 2007 is automatically called. The call to registration center 2007 may not be charged to the user with a collect call. After connected with registration center 2007, the user transmits its identification number and can automatically receive the telephone number of an optimum available gateway or a desired service data.

This function also permits the user to receive a new telephone number in the case: (1) that the telephone number of another gateway of which communication charge is lower, (2) that the telephone number of the current gateway is changed, or (3) that the telephone number which is usually called is switched to that of an alternative gateway from that of the current gateway which is always busy. It is also useful for the user to display a weather forecast or advertisement data on the LCD.

(Embodiment 19)

Figure 29:
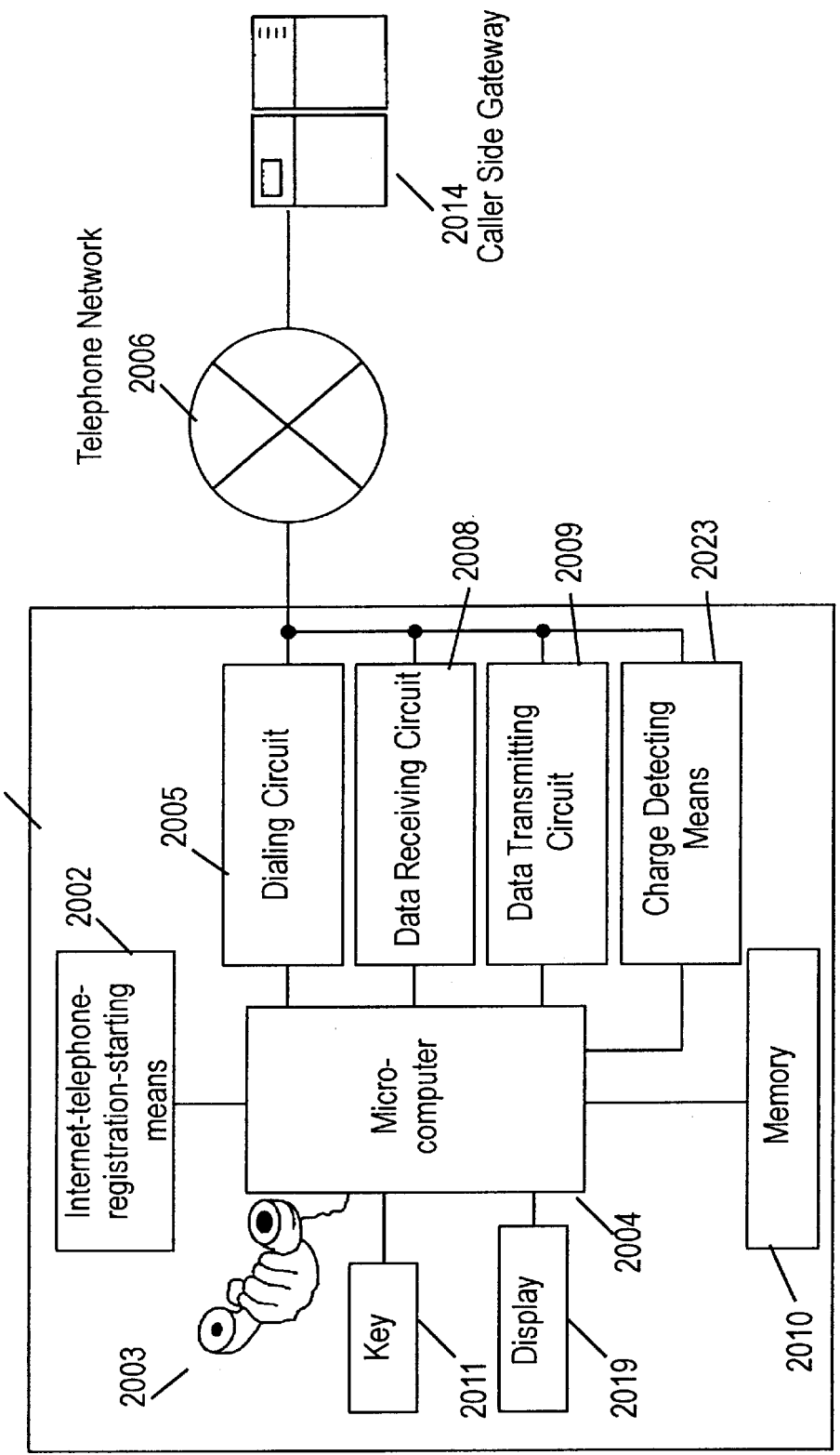
FIG. 29 is a diagram of an Internet-accessible telephone employing a charge detecting means according to Embodiment 19 of the present invention.

FIG. 29 is a schematic diagram of a system with an Internet-accessible telephone, which includes a charge detecting means, according to Embodiment 19 of the present invention. In FIG. 29, like components are denoted by like numerals as those shown in FIG. 15. Charge detecting means 2023 shown in FIG. 29 detects a connection-charge-notifying data contained in a call-end message of the Integrated Services Digital Network (ISDN) and a connection charge notifying pulse delivered in the public telephone network service.

Figure 30:
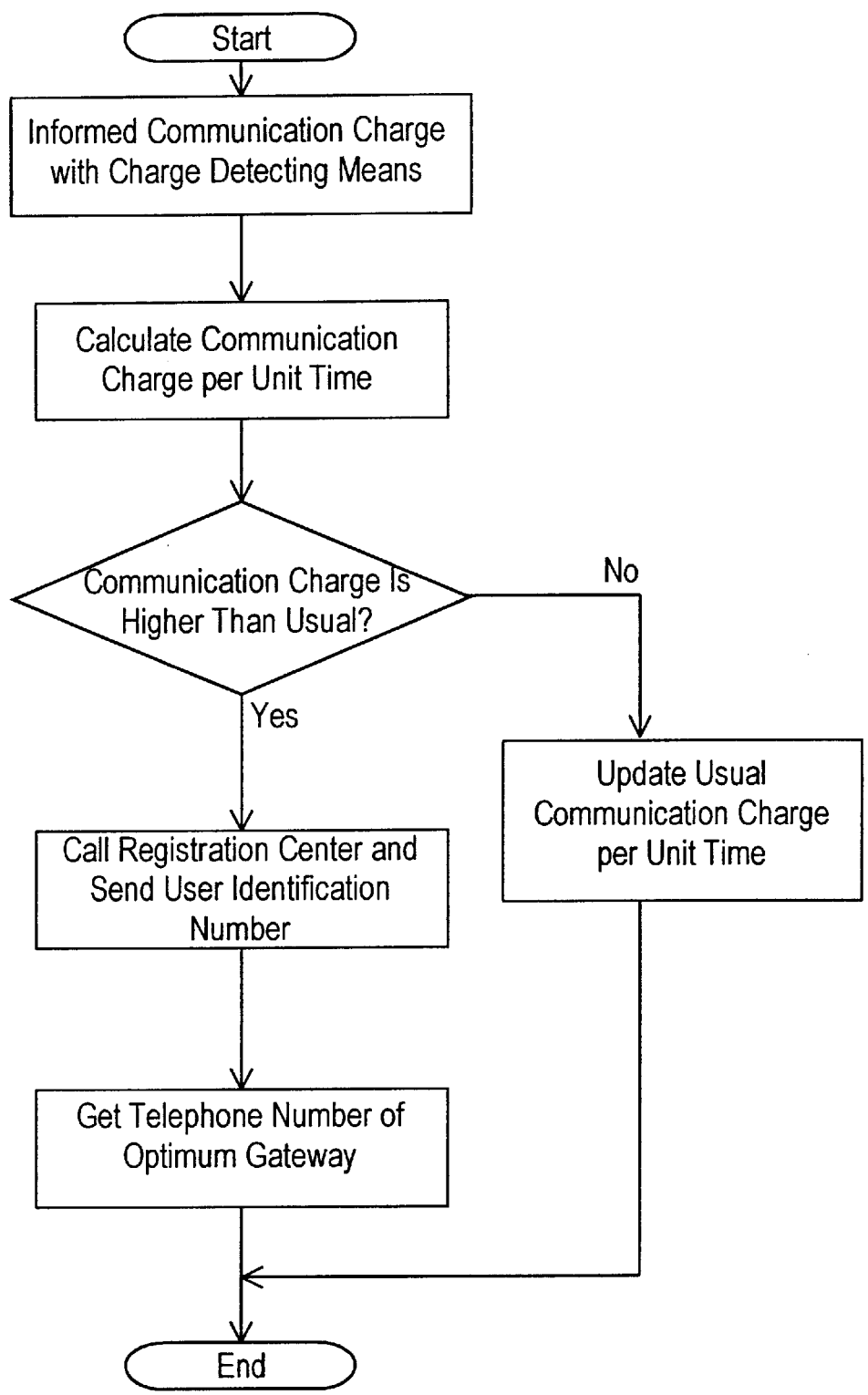
FIG. 30 is a flowchart of an action in the case that the charge of communication is great according to Embodiment 19.

FIG. 30 is a flowchart showing the action of Embodiment 19 when the connection charge is high. The flowchart is executed when each Internet telephoning is completed. The telephone is informed of the charge for connection to the current gateway by charge detecting means 2023. Simultaneously, the duration of the connection is calculated with a microcomputer. The connection charge per unit time is then determined from the duration and the charge for connection. Then, the connection charge per unit time is compared with the charge of the public telephone network service. When the connection charge per unit time is not higher the charge of the public telephone network service, the data of the charge per unit time is modified and the action terminates. When the connection charge per unit time is higher, the registration center is automatically called. The call to the registration center may not be charged to the user by a collect-call. As being connected with the registration center, telephone 2901 of the user transmits the user identification number and automatically receives the telephone number of an optimum gateway. For receiving the number, the telephone number of telephone 2901 is informed by the user upon finding a message inquiring the number on display 2019 or automatically informed with a caller number notifying service at the registration center.

Telephone 2901 of Embodiment 19 automatically updates the telephone number of its optimum gateway whenever the telephone network to be connected is changed because of user's moving and so on. And the user can thus always receive the service at the lowest charge.

The foregoing technologies and features of all the embodiments are not limited to be applied to telephone sets but to by any other like appliances including wireless telephones, telephone-equipped facsimiles, browser-aided telephones, and personal computers with Internet telephoning software with the same effect. Also, their functions and arrangements are not limited to those described above.

What is claimed is:

1. A service data communication system comprising:
    a line exchange network;
    data terminals each comprising a network interface for coupling to the line exchange network;
    a public telephone terminal;
    a data communication network;
    an inter-network link apparatus for connecting between the line exchange network and the data communication network;
    a service data provider apparatus for storing and providing service data which is one of advertisement data and chargeable data; and
    an exchange controller comprising:
        identifying means for identifying a user allowed to connect with the data communication network;
        communication means for connecting at least one of: (1) between any two of the data terminals; and (2) between one of the data terminal and the public telephone terminal; and
        service data controlling means for controlling the service data provider apparatus,
    wherein the service data controlling means, when a data terminal of the data terminals calls to start or calls to be in communication, makes the service data provider apparatus transmit a relevant service data to the data terminal which has called over the data communication network and the line exchange network;
        wherein the exchange controller further comprises charging means for administrating the service data as chargeable data,
    wherein the charging means, when the service data is a chargeable data for the user, charges the user for the service data, and
        wherein the charging means, when the service data is an advertisement data, charges an advertiser for the advertisement data.

2. A service data communication system according to claim 1, wherein the exchange controller comprises charging means for administrating the service data as chargeable data.

3. A service data communication system according to claim 1 further comprising charging means provided on the data communication network for administrating the service data as chargeable data.

4. A service data communication system according to claim 1 further comprising a data-terminal-dedicated-inter-network-link apparatus for allowing the data terminals to call and communicate with each other over the line exchange network and the data communication network.

5. A service data communication system according to claim 1,
    wherein at least one of the data terminals comprises an analog network interface and connects with only an analog form of the line exchange network, and
    wherein a communication over the data communication network is based on a digital communication protocol, and
    wherein the inter-network link apparatus is operable to connect to the analog form of the line exchange network.

6. A service data communication system according to claim 1,
    wherein at least one of the data terminals comprises a digital network interface and connects with only a digital form of the line exchange network,
    wherein a communication over the data communication network is based on a digital communication protocol, and
    wherein the inter-network link apparatus is operable to connect to the digital form of the line exchange network.

7. A service data communication system according to claim 1, wherein the data terminals are digital communication protocol data terminals operable to connect in a digital communication protocol to the inter-network link apparatus over the line exchange network.

8. A service data communication system according to claim 1, further comprising:
    public data terminals having a function as a public telephone; and
    a public-data-terminal-dedicated-inter-network-link apparatus for allowing the public data terminals to call and communicate over the line exchange network and the data communication network.

9. A service data communication system according to claim 8, wherein the inter-network link apparatus comprises a modulator for transmitting the service data in a digital form in an analog audio band, and wherein at least one of the public data terminals comprises a demodulator for demodulating an output of the modulator.

10. A service data communication system according to claim 7, wherein the inter-network link apparatus comprises means for transmitting the service wherein at least one of the data terminals comprises means for detecting the DTMF signal.

11. A service data communication system according to claim 1, wherein the data terminals are digital communication protocol data terminals operable to connect in digital communication protocol to the inter-network link apparatus over the line exchange network, and wherein the service data transmitted from the inter-network link apparatus to the digital communication protocol data terminals includes digital data in an Internet Protocol at least one of an audio data, a text data, and a video data.

12. A service data communication system according to claim 1 further comprising a service data storage apparatus coupled to the inter-network link apparatus.

13. A service data communication system according to claim 1, wherein the exchange controller further comprises terminal type identifying means for identifying types of the data terminals and selectively determining a type of the service data.

14. A service data communication system according to claim 1, further comprising terminal type identifying means provided on the data communication network for identifying a type of the data terminals and selectively determining a type of the service data.

15. A service data communication system according to claim 1, wherein the data terminals are digital communication protocol data terminals operable to connect in a digital communication protocol to the inter-network link apparatus over the line exchange network, and wherein at least one of the digital communication protocol data terminals is capable of utilizing an Internet protocol, having an Internet Protocol Address for a global communication, and directly connecting to the data communication network over the line exchange network not via the inter-network link apparatus.

16. A service data communication system according to claim 1, wherein the data terminals are digital communication protocol data terminals operable to connect in a digital communication protocol to the inter-network link apparatus over the line exchange network, and wherein at least one of the digital communication protocol data terminals is capable of utilizing an Internet protocol, having an Internet Protocol Address for a global communication, and directly connecting to the data communication network not via the line exchange network and the inter-network link apparatus.

17. A service data communication system according to claim 1, wherein the public data terminal is capable of transmitting and receiving a call as a public telephone.

18. A service data communication system according to claim 1, wherein the data terminals are digital communication protocol data terminals operable to connect in a digital communication protocol to the inter-network link apparatus over the line exchange network, and wherein at least one of the digital communication protocol data terminals capable of transmitting and receiving a call as a public telephone.

19. A service data communication system comprising:

a line exchange network;

data terminals each comprising a network interface for coupling to the line exchange network;

a public telephone terminal;

a data communication network;

an inter-network link apparatus for connecting between the line exchange network and the data communication network;

a service data provider apparatus for storing and providing service data which is one of advertisement data and chargeable data; and an exchange controller comprising:
identifying means for identifying a user allowed to connect with the data communication network;
communication means for connecting at least one of: (1) between any two of the data terminals: and (2) between one of the data terminal and the public telephone terminal;
service data controlling means for controlling the service data provider apparatus, wherein the service data controlling means, when a data terminal of the data terminals calls to start or calls to be in communication, makes the service data provider apparatus transmit a relevant service data to the data terminal which has called over the data communication network and the line exchange network, and charging means provided on the data communication network for administrating the service data as chargeable data, wherein the charging means, when the service data is a chargeable data for the user, charges the user for the service data, and wherein the charging means, when the service data is an advertisement data, charges an advertiser for the advertisement data.

20. A service data communication system according to claim 1, wherein at least one of the data terminals comprises:

means for receiving and storing a telephone number corresponding to the service data;

means for displaying the service data and a notice of storing the telephone number at the same time; and means for accessing the telephone number to call a provider of the service data.

21. A service data communication system according to claim 20, wherein the means for displaying the notice of storing the telephone number is displays the notice in one of a reverse monochrome and a color.

22. A service data communication system according to claim 20, wherein the means for displaying the notice of storing the telephone number is an array of light emitting diodes.

23. A service data communication system according to claim 1, wherein at least one of the data terminals comprises:
means for receiving and storing an E-mail address corresponding to the service data;
means for displaying the service data and a notice of storing the E-mail address at the same time; and means for accessing the E-mail address to send an E-mail to a provider of the service data, wherein at least one of the data terminals is a digital communication protocol data terminal operable to connect in a digital communication protocol to the inter-network link apparatus over the line exchange network, and wherein the digital communication protocol data terminal is capable to utilize an Internet protocol.

24. A service data communication system according to claim 1, wherein at least one of the data terminals comprises:
means for receiving and storing a Uniform Resource Locator (URL) corresponding to the service data;
means for displaying the service data and a notice of storing the URL; and
means for accessing the URL to obtain and display a home page of a provider of the service data, wherein at least one of the data terminals is a digital communication protocol data terminal operable to connect in a digital communication protocol to the inter-network link apparatus over the line exchange network, and wherein the digital communication protocol data terminal is operable to utilize an Internet protocol.

25. A service data communication system according to claim 1, wherein at least one of the data terminals comprises means for indicating that the service data is received via the inter-network link apparatus.

26. A service data communication system according to claim 25, wherein the means for indicating that the service data is received via the inter-network link apparatus displays at least one of in a reverse monochrome or in a color mode.

27. A service data communication system according to claim 25, wherein the means for indicating that the service data is received via the inter-network link apparatus emits sounds.

28. A service data communication system according to claim 25, wherein the means for indicating that the service data is received via the inter-network link apparatus produces a vibration.

29. A service data communication system according to claim 25, wherein the means for indicating that the service data is received via the inter-network link apparatus is a light emitting diode.

30. A service data communication system according to claim 1, wherein the exchange controller further comprises receiver-side-advertisement-data-display-recognizing means for recognizing that an advertisement data is displayed when the data terminals are called.

31. A service data communication system comprising:
a line exchange network;
data terminals each comprising a network interface for coupling to the line exchange network;
a public telephone terminal;
a data communication network;
an inter-network link apparatus for connecting between the line exchange network and the data communication network;
a service data provider apparatus for storing and providing service data which is one of advertisement data and chargeable data; and
an exchange controller comprising:
identifying means for identifying a user allowed to connect with the data communication network;
communication means for connecting at least one of: (1) between any two of the data terminals: and (2between one of the data terminal and the public telephone terminal; and
service data controlling means for controlling the service data provider apparatus, wherein the service data controlling means, when a data terminal of the data terminals calls to start or calls to be in communication, makes the service data provider apparatus transmit a relevant service data to the data terminal which has called over the data communication network and the line exchange network,
wherein the exchange controller further comprises charging means for administrating the service data chargeable data,
wherein the charging means, when the service data is the advertisement data, charges an advertiser for the advertisement data, and charges the advertiser for at least a part of a cost for the communication by the data terminal which has called.

32. A service data communication system comprising:
a line exchange network;
data terminals each comprising a network interface for coupling to the line exchange network;
a public telephone terminal;
a data communication network;
an inter-network link apparatus for connecting between the line exchange network and the data communication network;
a service data provider apparatus for storing and providing service data which is one of advertisement data and chargeable data; and
an exchange controller comprising
identifying means for identifying a user allowed to connect with the data communication network;
communication means for connecting at least one of: (1) between any two of the data terminals; and (2) between one of the data terminal and the public telephone terminal; and
service data controlling means for controlling the service data provider apparatus, wherein the service data controlling means, when a data terminal of the data terminals calls to start or calls to be in communication, makes the service data provider apparatus transmit a relevant service data to the data terminal which has called over the data communication network and the line exchange network, and
charging means provided on the data communication network for administrating the service data as chargeable data,
wherein the charging means, when the service data is the advertisement data, charges an advertiser for the advertisement data, and charges the advertiser for at least a part of a cost for the communication by the data terminal which has called.

* * * * *